(12) United States Patent
Zhao et al.

(10) Patent No.: US 12,231,921 B2
(45) Date of Patent: Feb. 18, 2025

(54) METHOD FOR ADJUSTING QUANTITY OF DATA STREAMS, TERMINAL, AND MIMO SYSTEM

(71) Applicant: Honor Device Co., Ltd., Shenzhen (CN)

(72) Inventors: Lianyi Zhao, Shenzhen (CN); Kai Yuan, Shenzhen (CN); Yanzhao He, Shenzhen (CN); Hongyang Ma, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 339 days.

(21) Appl. No.: 17/777,568

(22) PCT Filed: Jun. 15, 2021

(86) PCT No.: PCT/CN2021/099951
§ 371 (c)(1),
(2) Date: May 17, 2022

(87) PCT Pub. No.: WO2021/254301
PCT Pub. Date: Dec. 23, 2021

(65) Prior Publication Data
US 2022/0408281 A1 Dec. 22, 2022

(30) Foreign Application Priority Data
Jun. 16, 2020 (CN) .......................... 202010549263.3

(51) Int. Cl.
*H04W 24/02* (2009.01)
*H04B 7/0413* (2017.01)
*H04W 52/02* (2009.01)

(52) U.S. Cl.
CPC ......... *H04W 24/02* (2013.01); *H04B 7/0413* (2013.01); *H04W 52/0235* (2013.01)

(58) Field of Classification Search
CPC ............................. H04W 24/02; H04B 7/0413
See application file for complete search history.

(56) References Cited

U.S. PATENT DOCUMENTS

| | | | |
|---|---|---|---|
| 8,989,755 | B2 | 3/2015 | Muruganathan et al. |
| 10,764,829 | B2 | 9/2020 | Ge |

(Continued)

FOREIGN PATENT DOCUMENTS

| | | |
|---|---|---|
| CN | 104753579 A | 7/2015 |
| CN | 105144820 A | 12/2015 |

(Continued)

OTHER PUBLICATIONS

MediaTek Inc. (Rapporteur), "Email discussion summary on running 38.331 CR for Power Saving", 3GPP TSG-RAN WG2 Meeting #109e, R2-2000844, Online, Feb. 24-Mar. 6, 2020, 21 pages.

(Continued)

*Primary Examiner* — Won Tae C Kim
(74) *Attorney, Agent, or Firm* — Conley Rose, P.C.

(57) ABSTRACT

A method for adjusting a quantity of data streams, a terminal, and a MIMO system. In the method, the terminal may actively negotiate the quantity of transport layers used in a downlink data transmission process with a network device based on an operation status of the terminal, so as to adaptively and dynamically adjust the quantity of data streams in the downlink data transmission process. This may reduce power consumption of the terminal and prolong a standby time of the terminal without affecting user experience while meeting requirements for a data transmission rate of the terminal.

20 Claims, 17 Drawing Sheets

(56) References Cited

U.S. PATENT DOCUMENTS

| | | | |
|---|---|---|---|
| 10,992,502 B2 | 4/2021 | Su et al. | |
| 11,350,440 B2 | 5/2022 | Lin et al. | |
| 11,438,843 B2 | 9/2022 | Jiang et al. | |
| 2014/0011508 A1 | 1/2014 | Lee et al. | |
| 2016/0359661 A1 | 12/2016 | Chhabra et al. | |
| 2018/0109299 A1 | 4/2018 | Benjebbour et al. | |
| 2019/0104469 A1* | 4/2019 | Ge | H04W 52/0235 |
| 2019/0174466 A1 | 6/2019 | Zhang et al. | |
| 2021/0227472 A1 | 7/2021 | Liu et al. | |
| 2022/0159568 A1* | 5/2022 | Kim | H04W 52/02 |
| 2022/0287025 A1* | 9/2022 | Jin | H04B 7/0413 |
| 2022/0322339 A1* | 10/2022 | Park | H04W 72/0453 |

FOREIGN PATENT DOCUMENTS

| | | |
|---|---|---|
| CN | 107493597 A | 12/2017 |
| CN | 107707288 A | 2/2018 |
| CN | 110049563 A | 7/2019 |
| CN | 110324884 A | 10/2019 |
| CN | 110958699 A | 4/2020 |
| CN | 111212481 A | 5/2020 |
| CN | 111278097 A | 6/2020 |
| JP | 2012257154 A | 12/2012 |
| RU | 2722683 C1 | 6/2020 |
| WO | 2016121257 A1 | 8/2016 |
| WO | 2016163499 A1 | 10/2016 |
| WO | 2018084971 A1 | 5/2018 |

OTHER PUBLICATIONS

Ericsson, "UE adaptation to maximum number of MIMO layers", 3GPP TSG-RAN2 Meeting #107, R2-1909987, Prague, Czech Republic, Aug. 26-30, 2019, 10 pages.

Vivo, "Discussion on UE adaptation on maximum MIMO layer", 3GPP TSG-RAN WG2 Meeting #106, R2-1905958, Reno, USA, May 13-17, 2019, 3 pages.

Spreadtrum Communications, "Consideration on UE adaptation to maximum number of MIMO layers", 3GPP TSG RAN WG1 Meeting #99, R1-1912569, Reno, USA, Nov. 18-22, 2019, 4 pages.

Panasonic, "MIMO layer adaptation for NR power saving", 3GPP TSG RAN WG1 #98bis, R1-1910599, Chongqing, China, Oct. 14-20, 2019, 4 pages.

Vivo, "Discussion on UE adaptation to maximum number of MIMO layers", 3GPP TSG RAN WG1 #98bis, R1-1910235, Chongqing, China, Oct. 14-20, 2019, 5 pages.

Xiao, R., et al., "Research on Key Technologies of Cellular Internet of Things for 5G Mobile Communication," Modern Electronics Technology, May 2020, vol. 43 No. 9, 4 pages.

Vivo, "Discussion on UE adaptation to maximum number of MIMO layers", 3GPP TSG RAN WG1 #98, R1-1908172, Prague, Czech, Aug. 26-30, 2019, 4 pages.

Salzer T. et al., "Multiple Antenna Techniques", LTE—The UMTS Long Term Evolution: From Theory to Practice, Jul. 22, 2011, 30 pages.

* cited by examiner

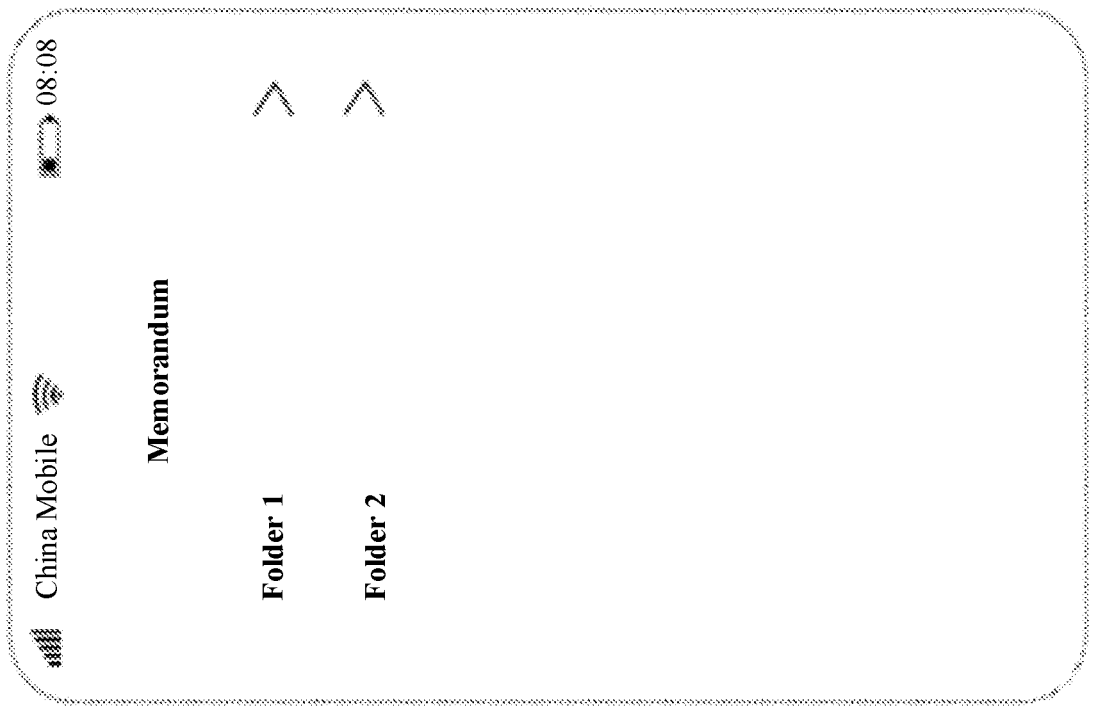
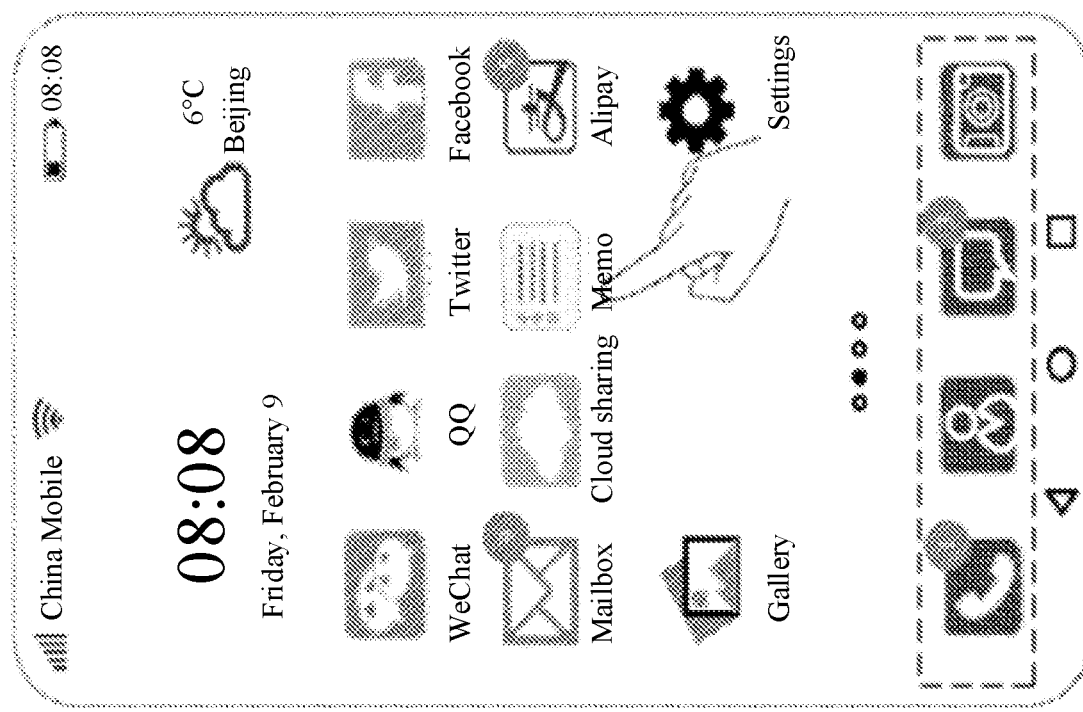
FIG. 4A

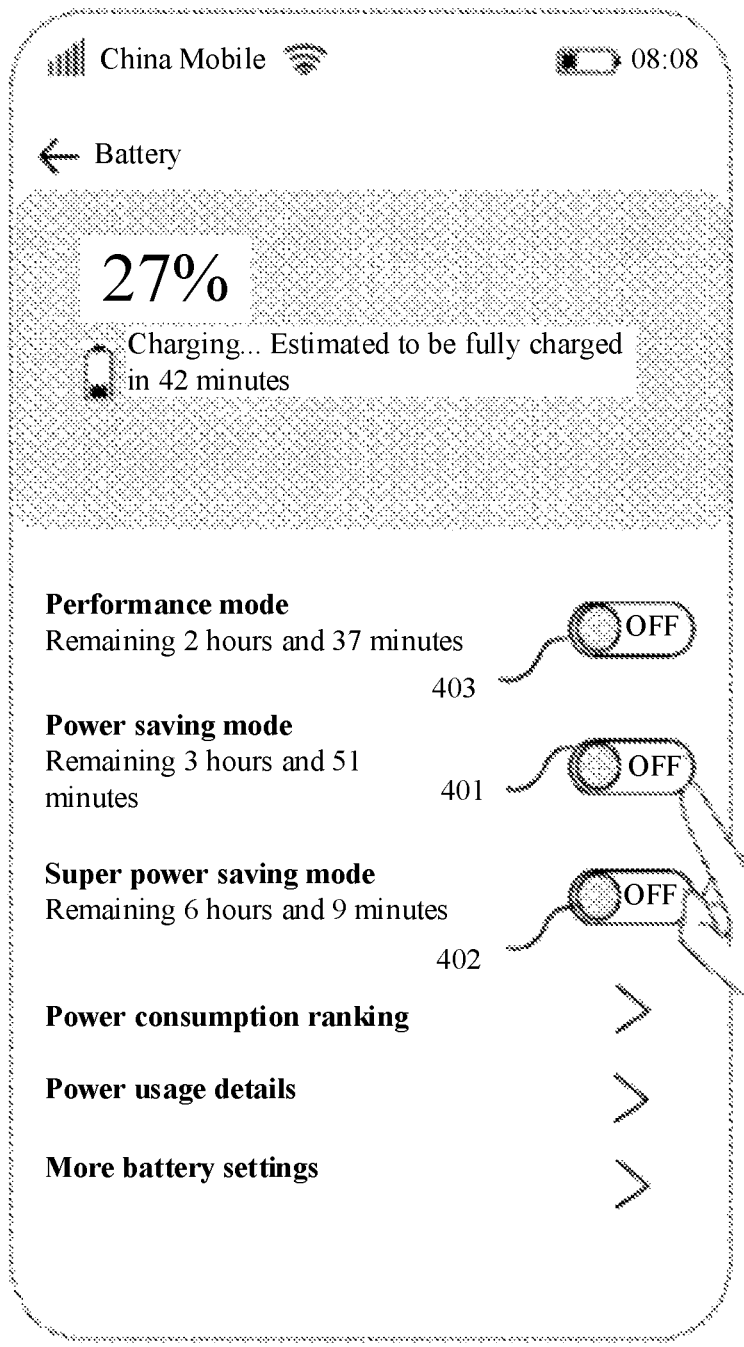
FIG. 4C(1)

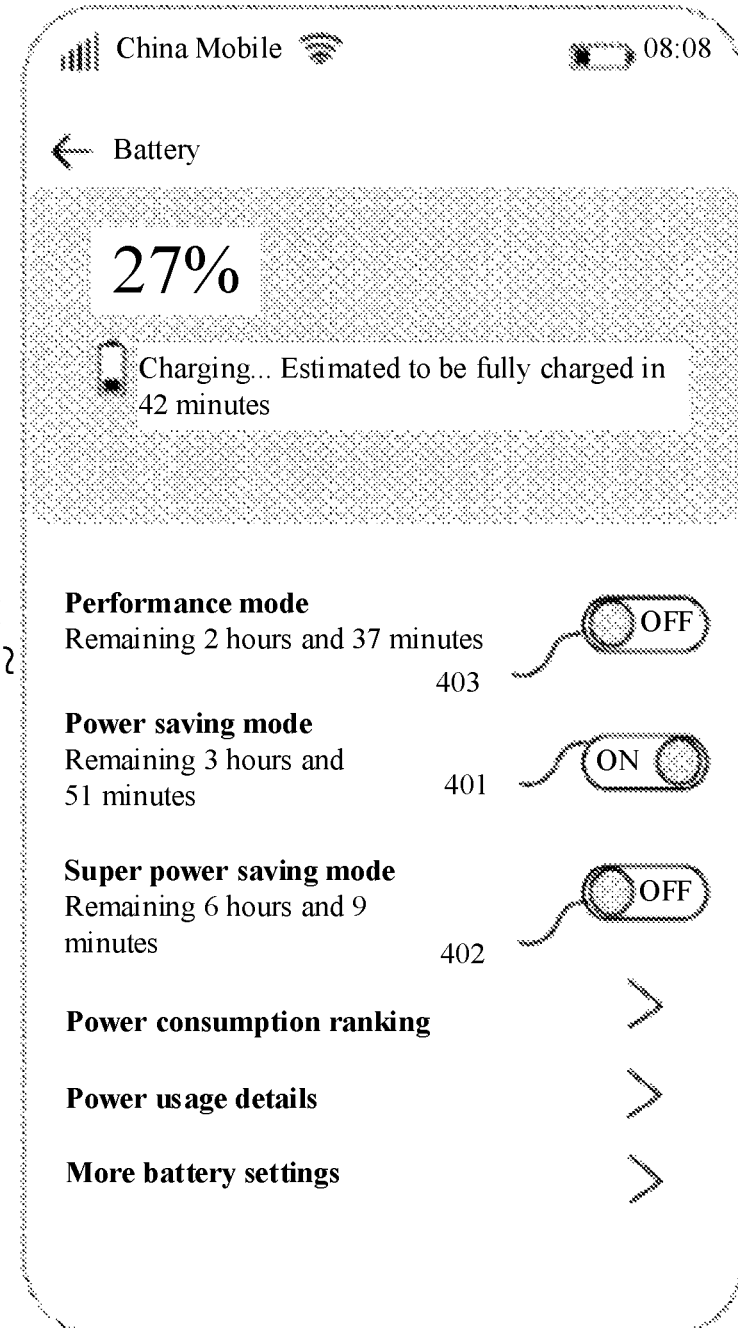
FIG. 4C(2)

METHOD FOR ADJUSTING QUANTITY OF DATA STREAMS, TERMINAL, AND MIMO SYSTEM

CROSS-REFERENCE TO RELATED APPLICATIONS

This application is a U.S. National Stage of International Application No. PCT/CN2021/099951 filed on Jun. 15, 2021, which claims priority to Chinese Patent Application No. 202010549263.3, filed with the China National Intellectual Property Administration on Jun. 16, 2020, both of which are incorporated herein by reference in their entireties.

TECHNICAL FIELD

Embodiments of this application relate to mobile communication technologies, and in particular, to a method for adjusting a quantity of data streams in a multiple-input multiple-output (Multiple-Input Multiple-Output, MIMO) system, a terminal, and a MIMO system.

BACKGROUND

MIMO refers to a technology of using a plurality of antennas to send and receive signals at a transmitting end and a receiving end respectively. MIMO is widely used in a long term evolution (long term evolution, LTE) system, a 5th generation mobile network (5th generation mobile network, 5G) system, a mobile MIMO system developed subsequently, and the like.

In the mobile MIMO system, a MIMO technology can make full use of space resources and improve channel capacity and communication quality, but increases power consumption of terminals. The power consumption of terminals is an important factor affecting user experience. In a process of using the MIMO technology, how to minimize power consumption of terminals while ensuring a signal transmission rate, so as to improve user experience, is a research direction of a person skilled in the art.

SUMMARY

Embodiments of this application provide a method for adjusting a quantity of data streams, a terminal, and a MIMO system, so as to reduce power consumption of the terminal and prolong a standby time of the terminal while meeting requirements for a data transmission rate of the terminal.

According to a first aspect, an embodiment of this application provides a method for adjusting a quantity of data streams, which is applied to a terminal side. The MIMO system includes a terminal and a network device, and a quantity of transport layers used by the MIMO system in a downlink data transmission process is a first transport layer quantity. The method includes: The terminal recognizes a first scenario, and sends a first message to the network device, where the first message is used to request the network device to reduce a quantity of transport layers used in the downlink data transmission process, the first message carries a second transport layer quantity, and the second transport layer quantity is less than the first transport layer quantity; the terminal receives a second message sent by the network device, where the second message is used to configure a quantity of transport layers in the downlink data transmission process, the second message carries a third transport layer quantity, and the third transport layer quantity is less than or equal to the second transport layer quantity; and the terminal receives and parses a downlink signal sent by the network device based on the third transport layer quantity.

With reference to the first aspect, one transport layer corresponds to one data stream, and different transport layers distinguish different data streams. By implementing the method according to the first aspect, the terminal may actively negotiate the quantity of transport layers (layer) used in the downlink data transmission process with the network device based on an operation status of the terminal, so as to adaptively and dynamically adjust the quantity of data streams in the downlink data transmission process. This method for adjusting the quantity of data streams may reduce power consumption of the terminal and prolong a standby time of the terminal without affecting user experience while meeting the requirements for the data transmission rate of the terminal.

With reference to the first aspect, in some embodiments, the first scenario is a scenario in which only a small quantity of data streams are needed to meet the requirements for the data transmission rate of the terminal. The first scenario may include one or a combination of more of the following: event A: the terminal runs a first application in the foreground; event B: a data transmission rate of the terminal is less than a first threshold; event C: a strength of a signal sent by the network device and received by the terminal is greater than a second threshold; event D: a screen of the terminal is off; event E: the terminal enters a "power saving mode"; event F: the terminal is in a non-charging state; and event G: a temperature of the terminal is greater than a third threshold.

In some embodiments, that the terminal recognizes a first scenario specifically includes one or more of the following: the terminal receives a user operation acting on an icon of the first application in a home screen, the terminal detects that reference signal received power RSRP or reference signal received quality RSRQ is less than the second threshold, the terminal receives no user operation in preset duration when the screen is on, the terminal receives a pressing operation acting on a power key when the screen is on, or the terminal receives a user operation acting on a switch control of "power saving mode".

With reference to the first aspect, in some embodiments, the terminal may further restore a quantity of transport layers used in a downlink data transmission process. Specifically, after the downlink signal sent by the network device is received and parsed based on the third transport layer quantity, the terminal may further recognize a second scenario corresponding to the first scenario, and send a third message to the network device, where the third message is used to request the network device to restore a quantity of transport layers used in the downlink data transmission process; then the terminal may further receive a fourth message sent by the network device, where the fourth message is used to configure a quantity of transport layers in the downlink data transmission process, and the fourth message carries the first transport layer quantity; and then the terminal receives and parses a downlink signal sent by the network device based on the first transport layer quantity. In this way, the quantity of downlink data streams can be flexibly adjusted, so as to meet the requirements for the data transmission rate of the terminal in the second scenario and improve user experience.

With reference to the second aspect, in some embodiments, the second scenario is a scenario in which more data streams are needed to meet requirements for the data transmission rate of the terminal. The second scenario may include one or a combination of more of the following: an application that the terminal runs in the foreground is not the first application, a data transmission rate of the terminal is greater than a fourth threshold, a strength of a signal sent by the network device and received by the terminal is less than a fifth threshold, a screen of the terminal is on, the terminal enters a "performance mode", the terminal is in a charging state, or a temperature of the terminal is less than a sixth threshold.

In some embodiments, that the terminal recognizes a second scenario corresponding to the first scenario specifically includes one or more of the following: event a: an application that the terminal runs in the foreground is not the first application; event b: a data transmission rate of the terminal is greater than a fourth threshold; event c: a strength of a signal sent by the network device and received by the terminal is less than a fifth threshold; event d: a screen of the terminal is on; event e: the terminal enters a "performance mode"; event f: the terminal is in a charging state; and event g: a temperature of the terminal is less than a sixth threshold.

In some embodiments, the first scenario may be preset by the terminal by default, or may be set by a user independently. After the first scenario is determined, the second scenario corresponding to the first scenario is also determined.

For example, when a low-speed scenario is a scenario in which event A occurs to the terminal, a corresponding high-speed scenario is a scenario in which event a occurs to the terminal. When a low-speed scenario is a scenario in which event B occurs to the terminal, a corresponding high-speed scenario is a scenario in which event b occurs to the terminal.

When a low-speed scenario is a scenario in which event A and event B occur to the terminal simultaneously, a corresponding high-speed scenario is a scenario in which any one or more of event a and event b occur to the terminal. When a low-speed scenario is a scenario in which event B and event C occur to the terminal simultaneously, a corresponding high-speed scenario includes a scenario in which any one or more of event b and event c occur to the terminal.

When a low-speed scenario is a scenario in which event A, event B, event C, event E, and event F occur to the terminal simultaneously, a corresponding high-speed scenario is a scenario in which any one or more of event a, event b, event c, event e, and event f occur to the terminal, and so on.

In some embodiments, duration between a time when the terminal receives the second message and a time when the terminal recognizes the second scenario is greater than or equal to the first duration. An interval between two consecutive adjustments of the quantity of data streams in the downlink data transmission process by the MIMO system is greater than or equal to the first duration. This can prevent a situation in which the terminal is frequently switched between a low-speed scenario and a high-speed scenario, so that the MIMO system will not frequently adjust the quantity of data streams in the downlink data transmission process.

In some specific embodiments, when receiving the second message, the terminal may start a timer (timer) of the first duration, and start to recognize whether the current scenario is the second scenario when the timer expires.

With reference to the first aspect, in some embodiments, if the first scenario includes that the terminal runs the first application in the foreground, duration between a time when the terminal starts to run the first application in the foreground and a time when the terminal recognizes the first scenario is greater than or equal to second duration. This can ensure that the quantity of downstream data streams will not be reduced in the second duration when the terminal starts to run the first application in the foreground, and ensure that the terminal has a higher data transmission rate in the second duration, thereby improving user experience.

In a specific embodiment, when starting to run the first application (for example, receiving a touch operation of the user for clicking an icon of the first application in a home screen) in the foreground, the terminal may start a timer (timer) of the second duration, and recognize whether the current scenario is the first scenario when the timer expires.

With reference to the first aspect, in some embodiments, the first message is an assistance message UE assistance information message, and the second transport layer quantity is carried in a reducedMIMO-LayerFRI-DL field of the assistance message.

With reference to the first aspect, in some embodiments, the second message is a radio resource control RRC reconfiguration message RRC reconfiguration, and the third transport layer quantity is carried in a MaxMimoLayerNum field in a serving cell configuration message PDSCH-serving cell configuration of a physical downlink shared channel.

In some embodiments, the third message is an assistance message UE assistance information message, and the third message includes no reducedMIMO-LayerFRI-DL field.

In some embodiments, the fourth message is a radio resource control RRC reconfiguration message RRC reconfiguration, and the first transport layer quantity carried in the fourth message is carried in a maximum transport layer quantity MaxMimoLayerNum field in a serving cell configuration message PDSCH-serving cell configuration of a physical downlink shared channel.

With reference to the first aspect, in some embodiments, the first transport layer quantity is configured by the network device for the terminal in response to a capability message UE capability information sent by the terminal. In some embodiments, the capability message carries a maximum quantity of downlink transport layers supported by the terminal. The maximum quantity of downlink transport layers supported by the terminal is less than or equal to a quantity of antennas configured by the terminal to support a 5G band, and is also less than or equal to a quantity of receiving radio frequency paths configured by the terminal.

With respect to the first aspect, in a specific example, the first transport layer quantity may be 4, the second transport layer quantity may be 2, and the third transport layer quantity may be 2.

With reference to the first aspect, in some embodiments, that the terminal receives and parses a downlink signal sent by the network device based on the third transport layer quantity specifically includes: the terminal receives, by using a third transport layer quantity of antennas, a downlink signal sent by the network device, filters and amplifies the downlink signal and converts the downlink signal into a baseband signal by using a third transport layer quantity of receiving radio frequency paths, and performs an inverse process of layer mapping on the baseband signal by using the third transport layer quantity.

With reference to the first aspect, in some embodiments, the MIMO system may further reduce a quantity of transport layers used in an uplink data transmission process based on an operation status of the terminal.

Specifically, a quantity of transport layers used by the MIMO system in the uplink data transmission process is a fourth transport layer quantity; the first message further carries a fifth transport layer quantity, and the fifth transport layer quantity is less than the fourth transport layer quantity;

the second message is also used to configure a quantity of transport layers in the uplink data transmission process, the second message further carries a sixth transport layer quantity, and the sixth transport layer quantity is less than or equal to the fifth transport layer quantity. Then, the terminal may send an uplink signal to the network device based on the sixth transport layer quantity.

In this way, the terminal may actively negotiate the quantity of transport layers used in the uplink data transmission process with the network device based on an operation status of the terminal, so as to adaptively and dynamically adjust the quantity of data streams in the uplink data transmission process. This method for adjusting the quantity of data streams may reduce power consumption of the terminal and prolong a standby time of the terminal without affecting user experience while meeting the requirements for the data transmission rate of the terminal.

In some embodiments, the terminal may further restore a quantity of transport layers used in an uplink data transmission process. Specifically, the third message sent by the terminal is further used to request the network device to restore a quantity of transport layers used in the uplink data transmission process; the fourth message received by the terminal is further used to configure a quantity of transport layers in the uplink data transmission process, and the fourth message carries the fourth transport layer quantity. Then, the terminal may send an uplink signal to the network device based on the fourth transport layer quantity. In this way, the quantity of uplink data streams can be flexibly adjusted, so as to meet the requirements for the data transmission rate of the terminal in the second scenario and improve user experience.

In some embodiments, the first message is an assistance message UE assistance information message, and the fifth transport layer quantity is carried in a reducedMIMO-LayerFRI-UL field of the assistance message.

In some embodiments, the second message is a radio resource control RRC reconfiguration message RRC reconfiguration, and the sixth transport layer quantity is carried in a maximum transport layer quantity MaxMimoLayerCnt field in a serving cell configuration message PUSCH-serving cell configuration of a physical uplink shared channel.

In some embodiments, the third message is an assistance message UE assistance information message, and the third message includes no reducedMIMO-LayerFRI-UL field.

In some embodiments, the fourth message is a radio resource control RRC reconfiguration message RRC reconfiguration, and the fourth transport layer quantity carried in the fourth message is carried in a maximum transport layer quantity MaxMimoLayerNum field in a serving cell configuration message PUSCH-serving cell configuration of a physical uplink shared channel.

In some embodiments, the fourth transport layer quantity is configured by the network device for the terminal in response to a capability message UE capability information sent by the terminal. In some embodiments, the capability message carries a maximum quantity of uplink transport layers supported by the terminal. The maximum quantity of uplink transport layers supported by the terminal is less than or equal to a quantity of antennas configured by the terminal to support a 5G band, and is also less than or equal to a quantity of sending radio frequency paths configured by the terminal.

In a specific example, the fourth transport layer quantity may be 2, the fifth transport layer quantity may be 1, and the sixth transport layer quantity may be 1.

In some embodiments, that the terminal sends an uplink signal to the network device based on the sixth transport layer quantity specifically includes: the terminal performs layer mapping on a baseband signal by using the sixth transport layer quantity, converts the baseband signal into a radio frequency signal and filters and amplifies the radio frequency signal by using a third transport layer quantity of receiving radio frequency paths to obtain an uplink signal, and sends the uplink signal by using a third transport layer quantity of antennas.

With reference to the first aspect, the method according to the first aspect is applicable to a 5G system in an SA networking mode. That is, both the terminal and the network device support a 5G band and operate on the 5G band, and the network device is connected to a 5G core network (5G core network, 5GC). In addition, the network device is a gNodeB, and the terminal communicates with the network device by using an NR link.

With reference to the first aspect, the method according to the first aspect is applicable to an LTE system. In the LTE system, both the terminal and the network device support a 4G band and operate on the 4G band, and the network device is connected to an EPC. In addition, the network device is an eNodeB, and the terminal communicates with the network device by using an LTE link.

With reference to the first aspect, the method according to the first aspect is further applicable to a MIMO system in future development of mobile communication, and no limitation is imposed in the embodiment of this application.

According to a second aspect, an embodiment of this application provides a terminal, including one or more processors and one or more memories. The one or more memories are coupled to the one or more processors. The one or more memories are configured to store computer program code. The computer program code includes computer instructions, and when the one or more processors execute the computer instructions, the terminal is enabled to perform the method according to any one of the first aspect or the possible implementations of the first aspect.

According to a third aspect, an embodiment of this application provides a computer storage medium, including computer instructions, where when the computer instructions are run on a terminal, a communication apparatus is enabled to perform the method according to any one of the first aspect or the possible implementations of the first aspect.

According to a fourth aspect, an embodiment of this application provides a computer program product, where when the computer program product runs on a computer, the computer is enabled to perform the method according to any one of the first aspect or the possible implementations of the first aspect.

According to a fifth aspect, an embodiment of this application provides a MIMO system, including a terminal and a network device, where the terminal may be the terminal according to the second aspect.

By implementing the technical solutions according to the embodiments of this application, the terminal may actively negotiate the quantity of transport layers used in the downlink data transmission process with the network device based on an operation status of the terminal, so as to adaptively and dynamically adjust the quantity of data streams in the downlink data transmission process. This method for adjusting the quantity of data streams may reduce power consumption of the terminal and prolong a standby time of the terminal without affecting user experience while meeting the requirements for the data transmission rate of the terminal.

BRIEF DESCRIPTION OF DRAWINGS

FIG. 4A to FIG. 4C(1)-FIG. 4C(2) show a user interface implemented on a terminal according to an embodiment of this application;

DESCRIPTION OF EMBODIMENTS

Technical solutions in embodiments of this application will be clearly described in detail with reference to the accompanying drawings. In the descriptions of the embodiments of this application, unless otherwise specified, "I" means "or", for example, A/B may mean A or B. The term "and/or" in this specification describes only an association relationship for describing associated objects and represents that three relationships may exist. For example, A and/or B may represent the following three cases: Only A exists, both A and B exist, and only B exists. In addition, in the description of the embodiments of this application, "a plurality of" refers to two or more.

Hereinafter, the terms "first" and "second" are used for descriptive purposes only and cannot be construed as implying relative importance or implying the quantity of indicated technical features. Therefore, a feature defined with "first" or "second" may explicitly or implicitly includes one or more of the features, and in the descriptions of embodiments of this application, "a plurality of" means two or more unless otherwise specified.

A MIMO technology is applicable to uplink data transmission and downlink data transmission in the field of mobile communication. A downlink data transmission amount is usually much greater than an uplink data transmission amount. The following embodiments of this application will be explained mainly by using the application of the MIMO technology in a downlink data transmission process as an example. The downlink data transmission processes mentioned in the following embodiments are all downlink data transmission processes based on the MIMO technology, that is, downlink data transmission processes performed in a MIMO system.

The downlink data transmission process needs to be completed by a network device (for example, a base station) and a terminal jointly. In the downlink data transmission process, the network device is a signal transmitting end, and the terminal is a signal receiving end. The terminal may also be referred to as user equipment (user equipment, UE). The network device converts an original data stream into several paths of parallel signals which are transmitted from a plurality of transmitting antennas simultaneously, respectively; and a plurality of receiving antennas at the receiving end receive the signals and parse the signals to restore original signals. In this process, a plurality of data streams may be transmitted in parallel over the air.

Figure 1A:
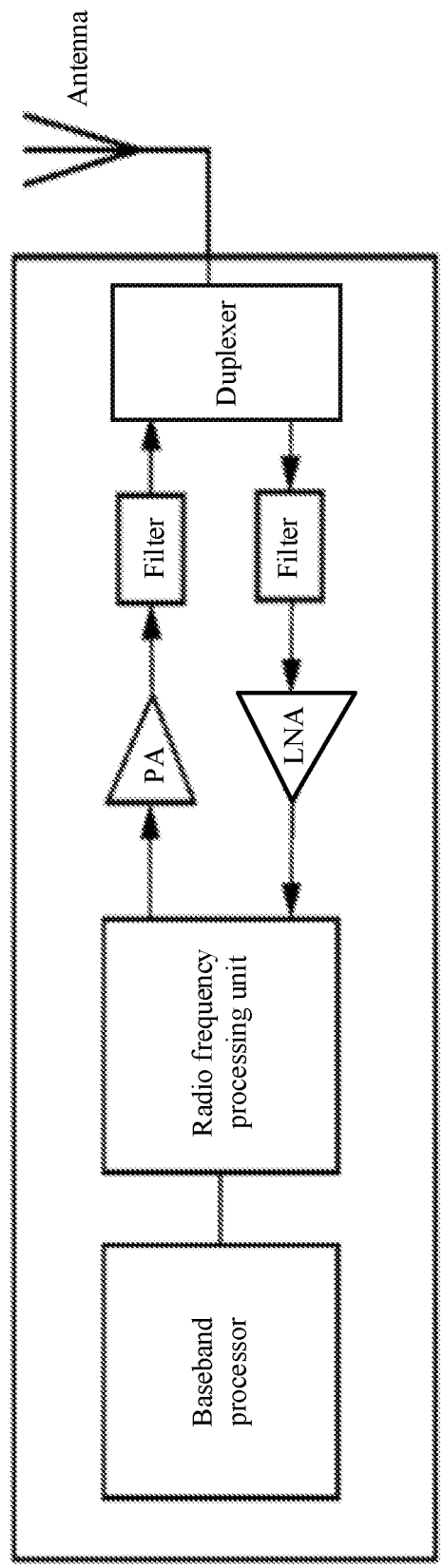
FIG. 1A is a schematic diagram of hardware involved in processing information by a network device in a downlink data transmission process.

In the downlink data transmission process, the network device needs to process the original data to be sent to the terminal, so as to ensure that the original data can be transmitted on a wireless space channel between the network device and the terminal. FIG. 1A shows a device used by a network device in a process of processing original data. The processing mainly includes: baseband processing and radio frequency processing.

First, the baseband processing mainly includes a physical layer algorithm executed by a baseband integrated circuit (baseband processor) (baseband integrated circuits, BBIC), processing of high layer protocols, implementation of multi-mode interoperability, and the like. The baseband processing may include the following:

1. Scrambling (Scrambling)

Scrambling refers to computation on codewords and a scrambling code sequence, is used to randomize the interference between data, and can resist interference. The codewords are a bit stream obtained after channel coding and interleaving. The bit stream is obtained by processing original data (for example, pictures, text, web pages, or videos) by a network device.

2. Modulation (Modulation)

Modulation is a process of mapping a bit stream onto a complex plane, and is also referred to as complex modulation.

3. Layer Mapping (Layer Mapping)

Layer mapping is to rearrange modulated bit streams based on certain rules and map codewords that are independent of each other onto a spatial transport layer (layer). Because a quantity of codewords and a quantity of layers are not necessarily the same, layer mapping is required. One layer corresponds to one data stream, and different layers distinguish different data streams. That is, a data stream refers to data transmitted at one layer. The layer quantity is less than or equal to a rank (rank) of a MIMO channel matrix.

4. Precoding

Precoding is to map data output by each layer to different antenna ports (antenna ports) for the purpose of diversity or multiplexing.

5. Resource mapping and generation of orthogonal frequency division multiplexing (orthogonal frequency division multiplexing, QFDM) signals Resource mapping refers to mapping precoded data to a two-dimensional physical resource element (resource element, RE) composed of subcarriers and timeslots on each determined antenna port.

The radio frequency processing mainly includes conversion between a baseband signal and a radio frequency signal performed by a radio frequency integrated circuit (radio frequency processor) (radio frequency integrated circuits, RFIC). The radio frequency processor can convert a baseband signal output by the baseband processor into a radio frequency signal. The radio frequency processor may alternatively be implemented as a modulator and a demodulator.

The radio frequency processing further includes signal processing performed by a radio frequency front end module (front end module, FEM). The radio frequency front end module may include: a power amplifier (power amplifier, PA), a filter (filter), a duplexer or multiplexer (duplexer or multiplexer), a low noise amplifier (low noise amplifier, LNA), an antenna switch (switch) or an antenna tuning module (ASM), or the like. In the downlink data transmission process, the PA is configured to amplify signal power output by the baseband processor, and the filter is configured to filter the signal.

Then, the processed signal is transmitted by using a physical antenna and a duplexer. After the network device sends the processed signal by using the antenna, the signal is transmitted through a spatial channel and received by a plurality of physical antennas (antenna, ANT) of the terminal. Herein, the quantity of the physical antennas used by the terminal is related to the layer quantity negotiated by the MIMO system. The quantity of the physical antennas used by the terminal is usually equal to the layer quantity negotiated by the MIMO system. Upon receiving the signal, the physical antennas of the terminal will perform an inverse process of the processing by the network device on the signal.

Figure 1B:
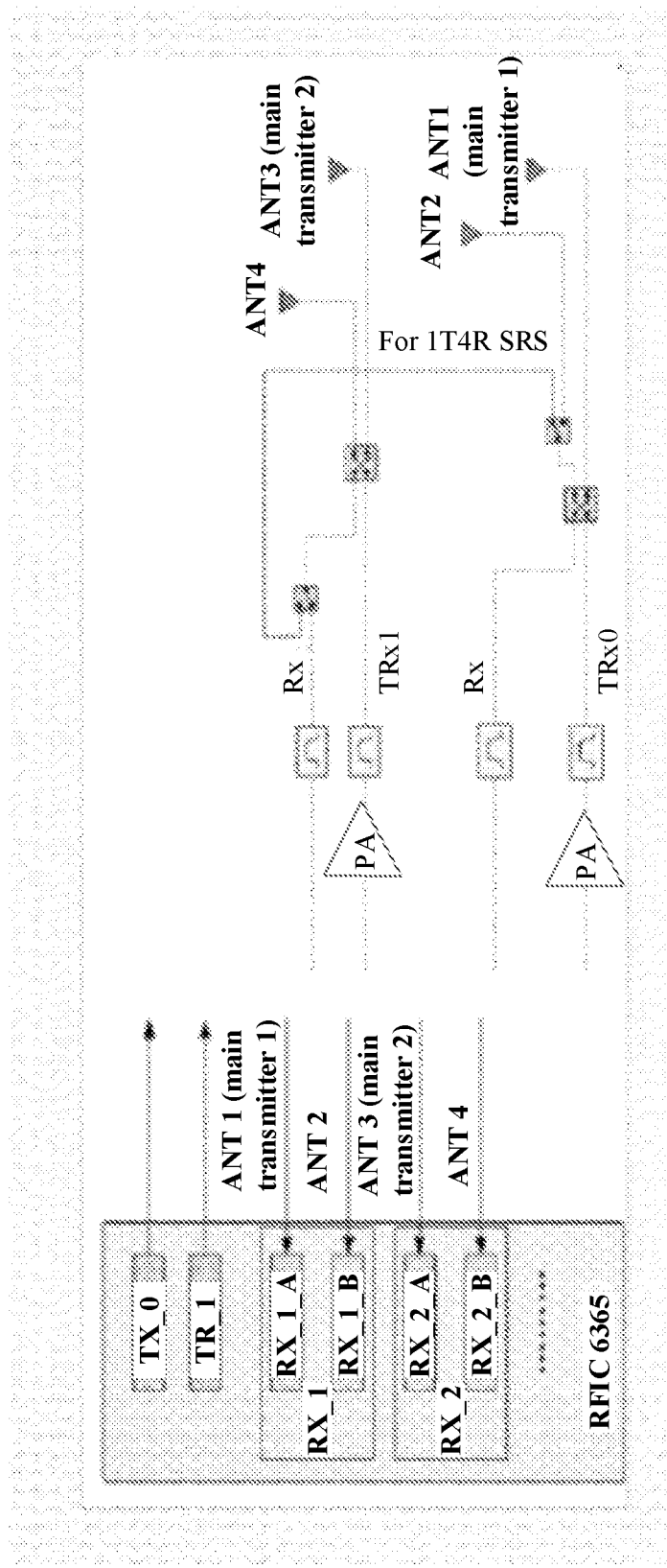
FIG. 1B is a schematic diagram of hardware involved in processing information by a terminal in a downlink data transmission process.

FIG. 1B is a schematic diagram of a scenario in which a terminal processes a received signal. Specifically, the terminal first performs radio frequency processing on the received signal, which mainly includes that a filter filters the signal, an LNA performs low noise amplification processing on the signal, and a radio frequency processor converts a radio frequency signal output by a radio frequency front end module into a baseband signal. Herein, devices (including an RFIC, the filter, the LNA, and the like) involved in radio frequency processing of one channel of signals (that is, a data stream) may be combined into a radio frequency path. Finally, the terminal performs baseband inverse processing on the signal. The terminal first reads corresponding data from a time-frequency resource of OFDM, performs inverse processes of precoding and layer mapping, then performs demodulation and descrambling, and finally restores original information bits. Then, a higher layer of the terminal such as MAC or an application can read the meanings of the original information bits based on an encapsulation manner and a source coding manner and restore the original data (such as pictures, text, web pages, videos, or audio) sent by the network device.

It may be understood that in the downlink data transfer process, a larger layer quantity indicates more physical antennas used when the terminal receives a signal sent by the network device, and a larger quantity of receiving radio frequency paths used for processing the signal. A receiving radio frequency path may include a filter, an LNA, a radio frequency processor (RFIC), and the like. As shown in FIG. 1B, when the layer quantity is 4, the terminal may use four antennas (ANT1 to ANT4) to receive different data streams. One data stream received by ANT1 is processed by a receiving radio frequency path including Rx_1_A, one data stream received by ANT2 is processed by a receiving radio frequency path including Rx_1_B, one data stream received by ANT3 is processed by a receiving radio frequency path including Rx_2_A, and one data stream received by ANT4 is processed by a receiving radio frequency path including Rx_2_B. When the layer quantity is 2, the terminal may receive data streams by using four antennas (ANT1 to ANT4). ANT1 and ANT2 receive one data stream, and ANT3 and ANT4 receive the other data stream; or the terminal may receive different data streams by using two antennas ANT 1 and ANT2, respectively; and after each antenna receives the data streams, the data streams are sent to corresponding receiving radio frequency paths for processing.

It may be learned that the layer quantity may affect the data processing of the terminal in the downlink data transmission process, mainly including a quantity of receiving antennas used by the terminal, a quantity of receiving radio frequency paths used, and inverse processes of layer mapping and precoding in baseband processing.

Obviously, in the downlink data transmission process, a larger quantity of data streams indicates a larger layer quantity, a larger quantity of antennas and receiving radio frequency paths used by the terminal, and higher power consumption.

In the existing technology, the quantity of data streams in the downlink data transmission process is usually determined based on the hardware capability (for example, the quantity of antennas and the quantity of receiving radio frequency paths) of the terminal. In this method of determining the data streams, as many data streams as possible are selected to transmit downlink data under the support of the terminal, so as to ensure high-rate data transmission. Although this method can meet the high-rate data transmission in the MIMO system, actual data transmission requirements and power consumption of the terminal are not considered, which will lead to excessive power consumption of the terminal and affect user experience. For example, in a 5G mobile MIMO system, a network device (for example, a next generation NodeB (next generation NodeB, gNB)) usually allocates four layers to a terminal to transmit downlink data, that is, four data streams may be used to transmit downlink data between the terminal and the network device. However, when the requirements for the downlink transmission rate of the terminal are not high, for example, in some scenarios of online text reading, when two data streams are used, requirements for actual data transmission of the terminal can be met, and if four data streams are used, it is excessively wasteful and may increase power consumption of the terminal.

Based on the disadvantages of the existing technology, the following embodiments of this application provide a method for adjusting a quantity of data streams, a terminal, and a MIMO system.

In the method according to the embodiment of this application, the terminal in the MIMO system may request the network device to reduce the quantity of layers in the downlink and/or uplink data transmission process in some scenarios in which requirements for the data transmission rate are not high. In addition, in some scenarios in which requirements for the data transmission rate are higher, the terminal may further request the network device to restore the quantity of layers in the downlink and/or uplink data transmission process. Adjusting the quantity of layers is equivalent to adjusting the quantity of data streams. In this way, the terminal may actively negotiate the quantity of layers used in the downlink and/or uplink data transmission process with the network device based on an operation status of the terminal, so as to adaptively and dynamically adjust the quantity of data streams in the downlink and/or uplink data transmission process. This method for adjusting the quantity of data streams may reduce power consumption of the terminal and prolong a standby time of the terminal without affecting user experience while meeting the requirements for the data transmission rate of the terminal.

For ease of description, in the following embodiments, a scenario in which the requirements for the data transmission rate of the terminal are not high is referred to as a low-speed scenario. The low-speed scenario may be one or a combination of more of the following events: event A: the terminal runs a first application in the foreground; event B: a data transmission rate of the terminal is less than a first threshold; event C: a strength of a signal sent by the network device 200 and received by the terminal is greater than a second threshold, event D: a screen of the terminal is off; event E: the terminal enters a "power saving mode"; event F: the terminal is in a non-charging state; and event G: or a temperature of the terminal is greater than a third threshold.

For ease of description, in the following embodiments, a scenario in which the requirements for the data transmission rate of the terminal are higher is referred to as a high-speed scenario. The high-speed scenario is relative to a low-speed scenario. The high-speed scenario may be one or a combination of more of the following events: event a: an application that the terminal runs in the foreground is not the first application; event b: a data transmission rate of the terminal is greater than a fourth threshold; event c: a strength of a signal sent by the network device 200 and received by the terminal is less than a fifth threshold; event d: a screen of the terminal is on; event e: the terminal enters a "performance mode"; event f: the terminal is in a charging state; and event g: a temperature of the terminal is less than a sixth threshold.

In subsequent method embodiments, the specific meanings of the low-speed scenario and the high-speed scenario, and the method of recognizing the low-speed scenario and the high-speed scenario by the terminal are explained in detail, and are not described in detail herein.

The method according to the embodiment of this application is applicable to MIMO systems using the MIMO technology, such as a long term evolution (long term evolution, LTE) system, a 5th generation mobile network (5th generation mobile network, 5G) system, and a mobile MIMO system developed subsequently. A networking mode of the 5G system may be standalone (standalone, SA) networking or non standalone (non standalone, NSA) networking.

Figure 2:
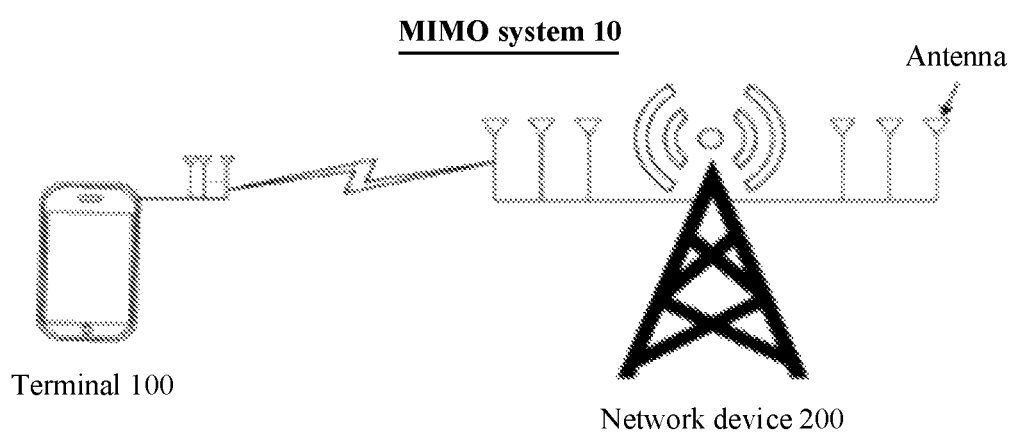
FIG. 2 is a schematic diagram of a structure of a MIMO system according to an embodiment of this application.

FIG. 2 is a schematic diagram of a structure of a MIMO system 10 according to an embodiment of this application. The MIMO system 10 shown in FIG. 2 may operate on a high-frequency band, and specifically may be an LTE system, a 5G system, a new radio (NR) system, a machine to machine (machine to machine, M2M) system, a wireless-fidelity (wireless-fidelity, Wi-Fi) system, or the like.

As shown in FIG. 2, the MIMO system 10 includes: a terminal 100 and a network device 200.

The terminal 100 may be a smartphone (for example, a phone running on an Android system or an iOS system), a tablet computer, a notebook computer, a palmtop computer, a mobile Internet device (MID, mobile Internet device), a wearable device (for example, a smartwatch or a smart band), a radio unit, a remote unit, a terminal agent, a mobile client, or another device that may access the Internet. The terminal 100 may be stationary or mobile.

The network device 200 may be an evolved NodeB (evolved NodeB, eNB), gNB, an access point (access point, AP), a transmit/receive point (transmit/receive point, TRP), a central unit (central unit, CU), or another network entity. The network device 200 may be stationary or mobile.

The network device 200 is responsible for connecting the terminal 100 to the core network by using a wired or wireless communication technology, and provides a connection between the terminal 100 and the network. That is, the network device 200 is configured to provide a wireless network access service for the terminal 100. One or more wireless communication protocols may be used for communication between the network device 200 and the terminal 100, and the communication protocols may include, but are not limited to, NR, LTE, LTE-advanced (LTE-advanced, LTE-A), high speed packet access (high speed packet access, HSPA), and Wi-Fi 802.11a/b/g/n/ac. That is, communication between the network device 200 and the terminal 100 may be performed by using an LTE link, may be performed by using an NR link, and may be performed by using a Wi-Fi link.

A wireless MIMO system 10 is a MIMO system. The network device 200 may be provided with a large-scale antenna array, and the terminal 100 may also be provided with an antenna array. A plurality of antennas of the network device 200 and the terminal 100 may transmit signals using a multi-antenna technology such as spatial multiplexing, space diversity, space division multiple access (SDMA), or beamforming.

In this embodiment of this application, the terminal 100 may be used to request the network device 200 to reduce the quantity of layers in the downlink data transmission process in a low-speed scenario. In addition, the terminal 100 may be further used to request the network device 200 to restore the quantity of layers in the downlink data transmission process in a high-speed scenario. After the network device 200 adjusts (reduces or restores) the quantity of layers in the downlink data transmission process based on the request of the terminal 100, the quantity of data streams used in the MIMO system is also adjusted. Then, in the downlink data transmission process, the terminal 100 will use the adjusted quantity of layers to parse a signal received from the network device 200, so as to obtain original data sent by the network device 200. For the process of signal parsing by the terminal 100, refer to FIG. 1B and related descriptions.

Herein, for the low-speed scenario and the high-speed scenario, refer to detailed descriptions in the subsequent method embodiments. For the method in which the terminal 100 requests the network device 200 to adjust the quantity of layers in the downlink data transmission process, reference may also be made to detailed descriptions of the subsequent method embodiments, and the method will not be described in detail herein.

In this embodiment of this application, the network device 200 may be configured to receive the message that the terminal 100 requests to adjust the quantity of layers in the downlink data transmission process, and may determine, in response to the message, the quantity of layers to be used in the downlink data transmission process with reference to frequency bands, antenna configurations, and the like supported by the terminal 100 and the network device 200, and notify the terminal 100 of the determining result. Then, the network device 200 processes to-be-sent original data based on the determined quantity of layers, and sends the processed signal to the terminal 100. For the process of processing the original data by the network device 200, refer to FIG. 1A and related descriptions.

The following describes the structures of the terminal 100 and the network device 200 according to the embodiments of this application.

Figure 3A:
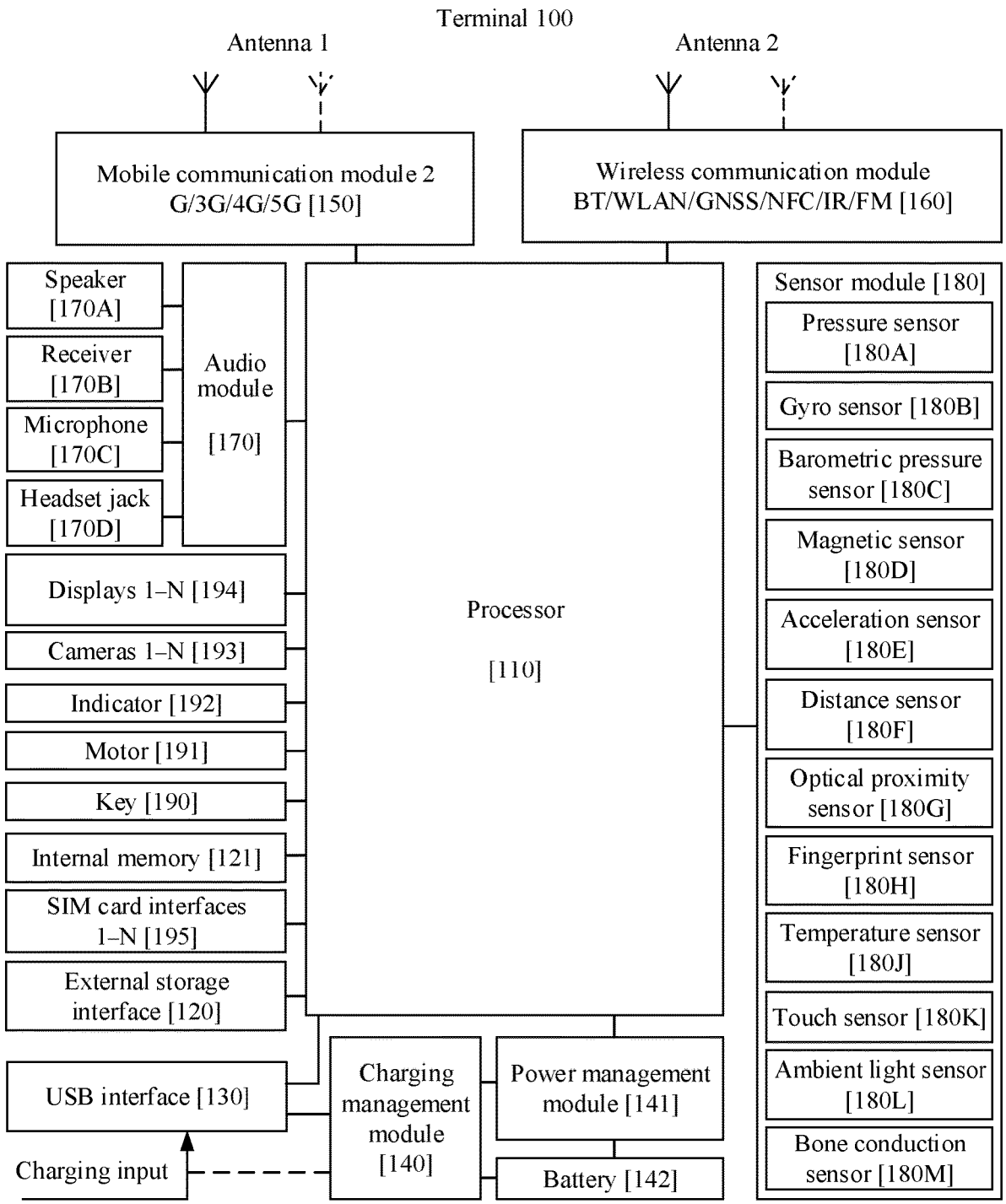
FIG. 3A is a schematic diagram of a hardware structure of a terminal according to an embodiment of this application.

FIG. 3A is an example of a schematic diagram of a structure of the terminal 100.

The terminal 100 may include: a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a key 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure illustrated in this embodiment of this application does not constitute a specific limitation on the terminal 100. In some other embodiments of this application, the terminal 100 may include more or fewer components than those shown in the figure, or combine some components, or split some components, or have different component arrangements. The illustrated components can be implemented by using hardware, software or a combination of software and hardware.

The processor 110 may include one or more processing units, for example: the processor 110 may include an application processor (application processor, AP), a modem processor (that is, the RFIC mentioned in the foregoing embodiment), a graphics processing unit (graphics processing unit, GPU), an image signal processor (image signal processor, ISP), a controller, a memory, a video codec, a digital signal processor (digital signal processor, DSP), a baseband processor, and the like. Different processing units may be independent devices, or may be integrated in one or more processors.

The controller may be a nerve center and a command center of the terminal 100. The controller may generate an operation control signal based on an instruction operation code and a timing signal, and read an instruction and control execution of instructions.

A memory may be further provided in the processor 110 to store instructions and data.

The USB interface 130 is an interface conforming to a USB standard specification, and may specifically be a Mini USB interface, a Micro USB interface, a USB Type C interface, or the like. The USB interface 130 may be configured to connect a charger to charge the terminal 100, and may also be configured to transmit data between the terminal 100 and a peripheral device.

The charging management module 140 is configured to receive a charging input from the charger. The charger may be a wireless charger, or may be a wired charger.

The terminal 100 is provided with a plurality of antennas. A wireless communication function of the terminal 100 may be implemented by using a plurality of antennas, such as the antenna 1 and the antenna 2, the mobile communication module 150, the wireless communication module 160, the modem processor, and the baseband processor.

The antennas are configured to transmit and receive electromagnetic wave signals. Each antenna in the terminal 100 may be used to cover a single or a plurality of communication frequency bands. For example, the terminal 100 may include 11 antennas, where four antennas cover a 5GNR communication band, four antennas cover an LTE communication band, two antennas cover a Wi-Fi communication band, and one antenna covers a GPS communication band. Different antennas may also be reused to improve antenna utilization. For example: The antenna 1 may be reused as a diversity antenna of a wireless local area network. In some other embodiments, the antenna may be used in combination with a tuning switch.

The mobile communication module 150 may provide a solution including wireless communication such as 2G/3G/4G/5G and applied to the terminal 100. The mobile communication module 150 may include at least one filter, a switch, a power amplifier, a low noise amplifier (low noise amplifier, LNA), and the like. The mobile communication module 150 may receive electromagnetic waves by using the antenna 1, perform filtering, amplification and other processing on the received electromagnetic waves, and transmit the waves to the modem processor for demodulation. The mobile communication module 150 may further amplify a signal modulated by the modem processor and convert the signal into electromagnetic waves by using the antenna 1 for radiation. In some embodiments, at least some functional modules of the mobile communication module 150 may be disposed in the processor 110. In some embodiments, at least some of the functional modules of the mobile communication module 150 may be disposed in the same device as at least some of the modules of the processor 110.

The modem processor may include a modulator and a demodulator. The modulator is configured to modulate a to-be-sent low-frequency baseband signal into a medium-high frequency signal. The demodulator is configured to demodulate the received electromagnetic wave signal into a low-frequency baseband signal. Then, the demodulator transmits the demodulated low-frequency baseband signal to the baseband processor for processing. The low-frequency baseband signal is processed by the baseband processor and then transmitted to the application processor. The application processor outputs a sound signal by using an audio device (not limited to the speaker 170A, the receiver 170B, and the like), or displays an image or a video by using the display 194. In some embodiments, the modem processor may be an independent device. In some other embodiments, the modem processor may be independent of the processor 110, and is disposed in the same device as the mobile communication module 150 or other functional modules.

The wireless communication module 160 may provide wireless communication solutions applied to the terminal 100, including a wireless local area network (wireless local area network, WLAN) (such as a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), an infrared (infrared, IR) technology, and the like. The wireless communication module 160 may be one or more devices that integrate at least one communication processing module. The wireless communication module 160 receives electromagnetic waves by using the antenna 2, performs frequency modulation and filtering on an electromagnetic wave signal, and transmits the processed signal to the processor 110. The wireless communication module 160 may further receive a to be-sent-signal from the processor 110, perform frequency modulation and amplification on the signal, and convert the signal into electromagnetic waves by using the antenna 2 for radiation.

In some embodiments, the antenna 1 of the terminal 100 is coupled to the mobile communication module 150, and the antenna 2 is coupled to the wireless communication module 160, so that the terminal 100 may communicate with a network and other devices (for example, the network device 200) by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), NR, BT, GNSS, a WLAN, NFC, FM, and/or an IR technology, and the like. The GNSS may include a global positioning system (global positioning system, GPS), a global navigation satellite system (global navigation satellite system, GLONASS), a Beidou navigation satellite system (Beidou navigation satellite system, BDS), a quasi-zenith satellite system (quasi-zenith satellite system, QZSS), and/or satellite based augmentation systems (satellite based augmentation systems, SBAS).

In this embodiment of this application, the downlink data transmission process may be completed by the mobile communication module 150 of the terminal 100 cooperating with other modules such as an antenna and a modem, or may be completed by the wireless communication module 160 of the terminal 100 cooperating with other modules.

In this embodiment of this application, the processor 110 may be configured to recognize a low-speed scenario and generate a message requesting the network device 200 to reduce the quantity of layers in the downlink data transmission process in the low-speed scenario. The antenna may be configured to send, to the network device 200, a message requesting the network device 200 to reduce the quantity of layers in the downlink data transmission process. Then, the antenna may further receive a message sent by the network device 200 indicating the quantity of layers after the reduction. Herein, for the specific implementation of the message sent by the antenna for requesting the network device 200 to reduce the quantity of layers in the downlink data transmission process and the message sent by the network device 200 for indicating the quantity of layers after the reduction, refer to related descriptions in subsequent method embodiments. Details are not described herein.

In this embodiment of this application, the processor 110 may be further configured to recognize a high-speed scenario and generate a message for requesting the network device 200 to restore the quantity of layers in the downlink data transmission process in the high-speed scenario. The antenna may be configured to send, to the network device 200, a message for requesting the network device 200 to restore the quantity of layers in the downlink data transmission process. Then, the antenna may further receive from the network device 200 a message indicating the quantity of layers after restoration. Herein, for the specific implementation of the message sent by the antenna for requesting the network device 200 to restore the quantity of layers in the downlink data transmission process and the message sent by the network device 200 for indicating the quantity of layers after the restoration, refer to related descriptions in subsequent method embodiments. Details are not described herein.

In this embodiment of this application, in the downlink data transmission process, the terminal 100 is used as a data receiving end, and the antenna of the terminal 100 may be configured to receive a signal sent by the network device 200. The modem processor, the receiving radio frequency path (including the RFIC, the filter, the LNA, and the like), and the baseband processor of the terminal 100 are further configured to cooperatively parse the signal. For the process of parsing the signal, refer to the foregoing related descriptions of FIG. 1B.

The terminal 100 implements a display function by using the GPU, the display 194, the application processor, and the like. The GPU is a microprocessor for image processing and connects the display 194 to the application processor. The GPU is configured to perform mathematical and geometric calculations for graphics rendering. The processor 110 may include one or more GPUs, where the one or more GPUs execute program instructions to generate or change display information.

The display 194 is configured to display an image, a video, and the like. In some embodiments, the terminal 100 may include one or N displays 194, where N is a positive integer greater than 1.

The internal memory 121 may be configured to store computer executable program code, where the executable program code includes instructions. The processor 110 executes various functional applications and data processing of the terminal 100 by executing the instructions stored in the internal memory 121. The internal memory 121 may include a program storage area and a data storage area.

The pressure sensor 180A is configured to sense a pressure signal and may convert the pressure signal into an electrical signal. In some embodiments, the pressure sensor 180A may be disposed on the display 194. There are many types of pressure sensors 180A, such as a resistive pressure sensor, an inductive pressure sensor, and a capacitive pressure sensor. The capacitive pressure sensor may be a parallel plate including at least two conductive materials. When a force is applied to the pressure sensor 180A, a capacitance between electrodes changes. The terminal 100 determines an intensity of the pressure based on a change in capacitance. When a touch operation is applied to the display 194, the terminal 100 detects an intensity of the touch operation based on the pressure sensor 180A. The terminal 100 may also calculate a position of the touch based on a detection signal of the pressure sensor 180A.

The temperature sensor 180J is configured to detect a temperature. In some embodiments, the terminal 100 performs a temperature processing policy by using the temperature detected by the temperature sensor 180J. For example, when the temperature reported by the temperature sensor 180J exceeds a threshold, the terminal 100 reduces performance of a processor near the temperature sensor 180J, so as to reduce power consumption to implement thermal protection. In some other embodiments, when the temperature is less than another threshold, the terminal 100 heats the battery 142 to avoid abnormal shutdown of the terminal 100 caused by low temperature. In some other embodiments, when the temperature is less than still another threshold, the terminal 100 boosts an output voltage of the battery 142 to avoid abnormal shutdown caused by low temperature.

The touch sensor 180K is also referred to as a "touch panel". The touch sensor 180K may be disposed on the display 194, and the touch sensor 180K and the display 194 constitute a touch screen, which is also referred to as a "touch control screen". The touch sensor 180K is configured to detect a touch operation on or near the touch sensor 180K. The touch sensor may transfer the detected touch operation to the application processor to determine a touch event type. A visual output associated with the touch operation may be provided by using the display 194. In some other embodiments, the touch sensor 180K may alternatively be disposed on the surface of the terminal 100 at a position different from that of the display 194.

A software system of the terminal 100 may have a layered architecture, an event-driven architecture, a microkernel architecture, a micro-service architecture, or a cloud architecture. This embodiment of this application describes a software architecture of the terminal 100 by using an Android system with a layered architecture as an example.

Figure 3B:
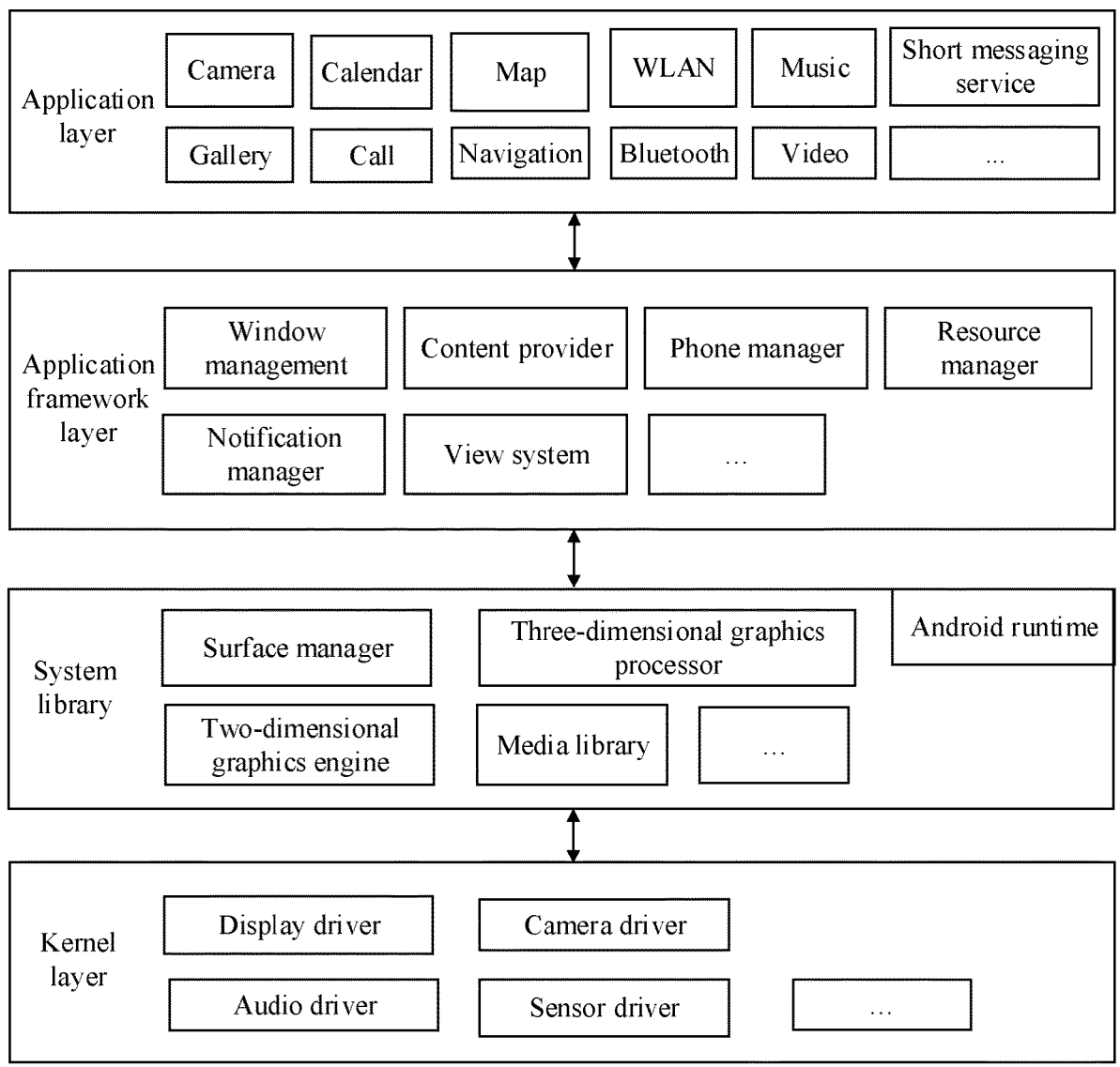
FIG. 3B is a schematic diagram of a software architecture of a terminal according to an embodiment of this application.

FIG. 3B is a block diagram of a software architecture of a terminal 100 according to an embodiment of this application.

The layered architecture divides the software into several layers, and each layer has a clear function and division of labor. The layers communicate with each other by using a software interface. In some embodiments, the Android system is divided into four layers, that is, an application layer, an application framework layer, an Android runtime (Android runtime) and system library, and a kernel layer from top to bottom.

The application layer may include a series of application packages.

As shown in FIG. 3B, the application packages may include applications such as camera, gallery, calendar, call, map, navigation, WLAN, Bluetooth, music, video, and short messaging service.

The application framework layer provides an application programming interface (application programming interface, API) and a programming framework for applications at the application layer. The application framework layer includes some predefined functions.

As shown in FIG. 3B, the application framework layer may include a window manager, a content provider, a view system, a phone manager, a resource manager, a notification manager, and the like.

The window manager is configured to manage a window program. The window manager may obtain a display size, determine whether the display has a status bar, lock the screen, take a screenshot, and the like.

The content provider is configured to store and obtain data and make the data accessible to applications. The data may include videos, images, audio, calls made and received, browsing history and bookmarks, an address book, and the like.

The view system includes visual controls, such as a control for displaying text or a control for displaying pictures. The view system may be configured to construct applications. A display interface may be composed of one or more views. For example, a display interface including a short messaging service notification icon may include a view for displaying text and a view for displaying pictures.

The phone manager is configured to provide a communication function of the terminal 100, such as management of a call status (including connection, hanging up, and the like).

The resource manager provides various resources for applications, such as localized strings, icons, pictures, layout files, and video files.

The notification manager enables applications to display notification information in a status bar, may be used to convey notification-type messages, and may automatically disappear after a short pause without user interaction. For example, the notification manager is used to notify download completion, a message alert, and the like. The notification manage may be further a notification that appears in the status bar at the top of the system in the form of a chart or scroll bar text, such as a notification for an application running in the background, or a notification that appears on the screen in the form of a dialog window. For example, prompt text information is presented in the status bar, a warning tone is given, the terminal vibrates, and an indicator flashes.

Android runtime includes a core library and a virtual machine. Android runtime is responsible for scheduling and management of the Android system.

The core library includes two parts: One part is a function that the java language needs to invoke, and the other part is a core library of Android.

The application layer and the application framework layer run in the virtual machine. The virtual machine executes java files at the application layer and the application framework layer as binary files. The virtual machine is used to perform functions such as object lifecycle management, stack management, thread management, security and exception management, and garbage collection.

The system library may include a plurality of functional modules, such as a surface manager (surface manager), a media library (Media Libraries), a three-dimensional graphics processing library (for example, OpenGLES), a 2D graphics engine (for example, SGL).

The surface manager is configured to manage a display subsystem, and provides fusion of 2D and 3D layers for a plurality of applications.

The media library supports playback and recording of audio and videos in various commonly used formats, still image files, and the like. The media library may support a plurality of audio and video coding formats, such as MPEG4, H.264, MP3, AAC, AMR, JPG, and PNG.

The three-dimensional graphics processing library is used to implement three-dimensional graphics drawing, image rendering, synthesis, layer processing, and the like.

The 2D graphics engine is a drawing engine for 2D drawing.

The kernel layer is a layer between hardware and software. The kernel layer includes at least a display driver, a camera driver, an audio driver, and a sensor driver.

Figure 3C:
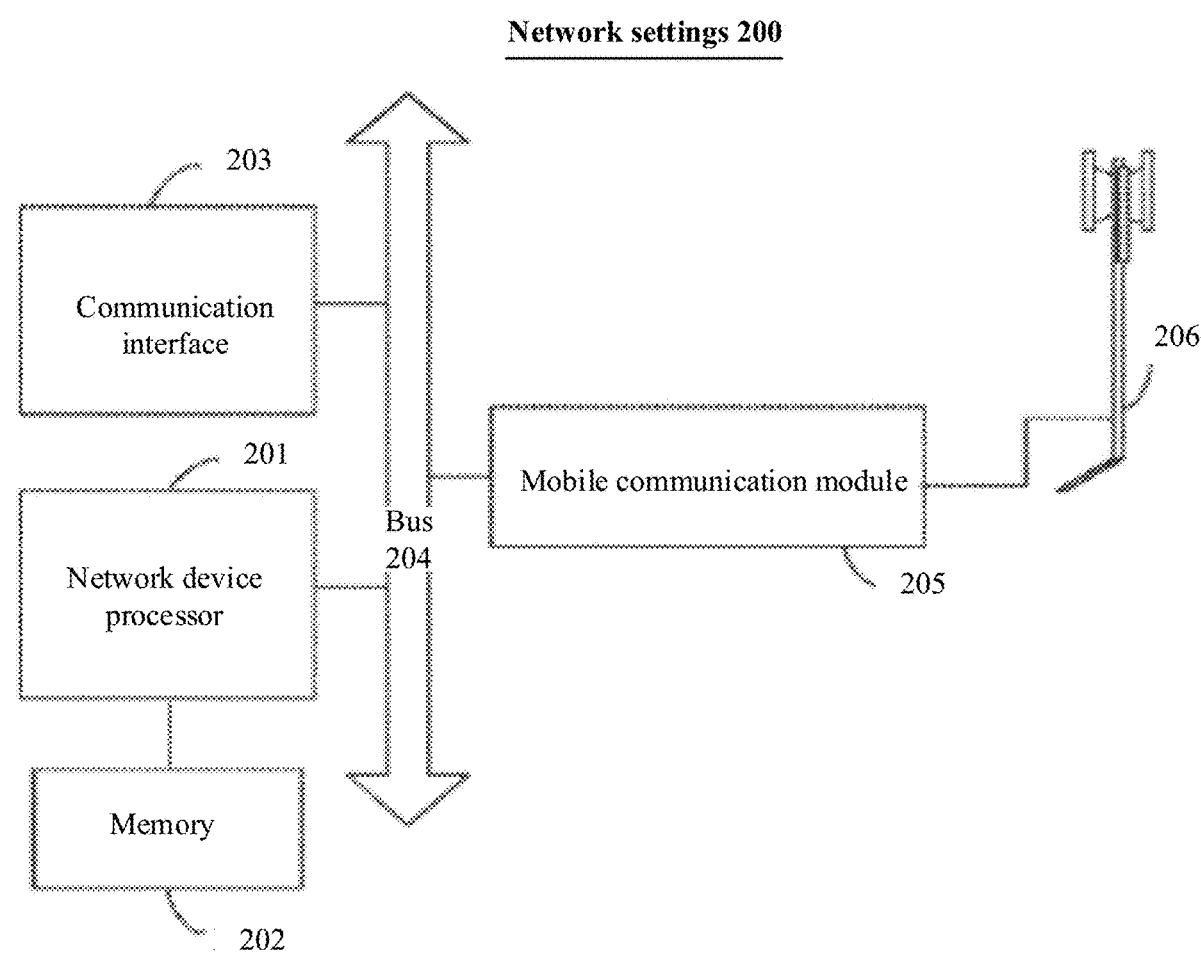
FIG. 3C is a schematic diagram of a hardware structure of a network device according to an embodiment of this application.

FIG. 3C is a schematic diagram of a structure of a network device 200 according to an embodiment of this application. The network device 200 may include: one or more processors 201, a memory 202, a communication interface 203, a mobile communication module 205, and an antenna 206. These components may be connected by a bus 204 or in another manner. In FIG. 3C, connection by a bus is used as an example.

The processor 201 may include one or more processing units, for example: the processor 110 may include an application processor (application processor, AP), a modem processor, a controller, a memory, a baseband processor, and the like. Different processing units may be independent devices, or may be integrated in one or more processors.

The communication interface 203 may be configured to enable the network device 200 to communicate with other communication devices, such as the terminal 100 or other network devices. Specifically, the communication interface 203 may be a 5G or future new radio communication interface. In addition to a wireless communication interface, the network device 200 may also be provided with a wired communication interface 203 to support wired communication, for example, a backhaul link between one network device 200 and another network device may be a wired communication connection.

The mobile communication module 205 may provide a solution including wireless communication such as 2G/3G/4G/5G and applied to the network device. The mobile communication module 150 may include at least one filter, a switch, a power amplifier, a low noise amplifier (low noise amplifier, LNA), and the like. The mobile communication module 205 may receive electromagnetic waves by using the antenna 206, perform filtering, amplification and other processing on the received electromagnetic waves, and transmit the waves to the modem processor for demodulation. The mobile communication module 205 may further amplify a signal modulated by the modem processor and convert the signal into electromagnetic waves by using the antenna 206 for radiation. In some embodiments, at least some functional modules of the mobile communication module 205 may be disposed in the processor 201. In some embodiments, at least some of the functional modules of the mobile communication module 205 may be disposed in the same device as at least some of the modules of the processor 201.

The antenna 206 may be configured to convert electromagnetic energy in a transmission line into electromagnetic waves in a free space, or to convert electromagnetic waves in a free space into electromagnetic energy in the transmission line. The antenna 206 may be configured to cover a single or a plurality of communication bands. For example, the antenna 206 may cover a 5GNR communication band, an LTE communication band, a Wi-Fi communication band, a GPS communication band, or the like. A plurality of antennas 206 may be provided. It may be understood that the antennas 206 of the network device may be implemented as a large-scale antenna array.

In this embodiment of this application, the antenna 206 may be configured to receive a message sent by the terminal 100 for requesting the network device 200 to adjust (reduce or restore) the quantity of layers in the downlink data transmission process. Then, the processor 201 may determine the quantity of layers to be used in the downlink data transmission process based on frequency bands, antenna configurations, and the like supported by the terminal 100 and the network device 200, and send, by using the antenna 206, a message for indicating the determined quantity of layers to the terminal 100.

In this embodiment of this application, in the downlink data transmission process, the network device 200 serves as a data transmitting end and performs baseband processing and radio frequency processing on original data. Reference may be made to FIG. 1A and related descriptions.

The memory 202 is coupled to the processor 201, and is configured to store various software programs and/or a plurality of sets of instructions. Specifically, the memory 202 may include a high-speed random access memory, and may also include a non-volatile memory, such as one or more disk storage devices, a flash memory device, or another non-volatile solid-state storage device.

The memory 202 may store an operating system (hereinafter referred to as the system), for example, an embedded operating system such as uCOS, VxWorks, or RTLinux. The memory 202 may further store a network communication program that may be used to communicate with one or more additional devices, one or more terminal devices, or one or more network devices.

In this embodiment of this application, the processor 201 may be configured to read and execute computer readable instructions. Specifically, the processor 201 may be configured to invoke a program stored in the memory 202, such as an implementation program of the method according to one or more embodiments of this application on the network device 200 side, and execute instructions contained in the program.

It should be noted that the network device 200 shown in FIG. 3C is only one implementation of this embodiment of this application, and in actual application, the network device 200 may further include more or fewer components. This is not limited herein.

Based on the MIMO system 10 shown in FIG. 2, the terminal 100 shown in FIG. 3A and FIG. 3B, and the network device 200 shown in FIG. 3C, the method for adjusting a quantity of data streams according to this embodiment of this application is described in detail below.

The method according to this embodiment of this application involves two scenarios:

a low-speed scenario and a high-speed scenario. Before the method according to this embodiment of this application is described in detail, the two scenarios are first described.

(I) Low-Speed Scenario

In this embodiment of this application, the low-speed scenario may be any one of a combination of more of the following events: event A: the terminal 100 runs a first application in the foreground; event B: a data transmission rate of the terminal 100 is less than a first threshold; event C: a strength of a signal sent by the network device 200 and received by the terminal 100 is greater than a second threshold, event D: a screen of the terminal 100 is off; event E: the terminal 100 enters a "power saving mode"; event F: the terminal 100 is in a non-charging state; and event G: or a temperature of the terminal 100 is greater than a third threshold.

The following will explain event A to event G one by one:

1. Event A: The terminal 100 runs a first application in the foreground.

An application providing an interface of the terminal 100 displayed on a display is an application running in the foreground. That is, the application that a user can currently operate on the display is an application running in the foreground.

One or more first applications may be provided. The first application may include: an application for which an average data transmission rate of the terminal 100 during the running of the application is less than a preset value. The average data transmission rate may be a downlink average data transmission rate when the terminal 100 runs the first application. The preset value may be preset, and no limitation is imposed on this preset value in this embodiment of this application.

That is, the first application is an application for which no high data transmission rate is required, and only a small quantity of data streams are required to meet data transmission requirements of the first application. The first application may be preset by the terminal, or may be updated in real time by the terminal based on information obtained from a network. For example, the first application may be a reading type application, an instant messaging type application, a text recording type application, or the like.

In some embodiments, a whitelist may be stored in the terminal 100, and the whitelist may include all first applications installed in the terminal 100. In some other embodiments, a blacklist may be stored in the terminal 100, and the blacklist may include all first applications installed in the terminal 100. In this way, the terminal 100 may determine the application currently running in the foreground as the first application when recognizing that the application running in the foreground is in the whitelist or not in the blacklist.

It may be understood that there are many possible situations in which event A occurs to the terminal 100, and no limitation is imposed on this in this embodiment of this application. For example, when the terminal 100 receives a touch operation of the user for clicking an icon of the first application in a home screen, the terminal 100 starts to run the first application in the foreground, that is, event A occurs to the terminal 100. FIG. 4A shows a scenario in which event A occurs to the terminal 100. As shown in FIG. 4A, the terminal 100 may start and run a "memorandum" application in the foreground in response to the user's operation of clicking an icon of the "memorandum" application.

It may be understood that when event A occurs to the terminal 100, that is, when the terminal 100 runs the first application in the foreground, requirements for the data transmission rate is not high, and only a small quantity of data streams are required to meet the requirements for data transmission of the terminal 100.

2. Event B: The data transmission rate of the terminal 100 is less than a first threshold.

Herein, that the data transmission rate of the terminal 100 is less than the first threshold may refer to any of the following: The data transmission rate of the terminal 100 at a single time point is less than the first threshold, an average data transmission rate of the terminal 100 in a time period is less than the first threshold, the data transmission rate of the terminal 100 at any time point in a time period is less than the first threshold, and the data transmission rate of the terminal 100 for consecutive k times is less than the first threshold. The time period and k may be preset, and no limitation is imposed on this in this embodiment of this application.

In some embodiments, the data transmission rates of the terminal 100 may be all data transmission rates of the terminal 100, such as all downlink data transmission rates of the terminal 100. In this case, the first threshold may be preset, and no limitation is imposed on the first threshold in this embodiment of this application. For example, the first threshold may be 5 million bits per second (million bits per second, Mbps).

In some other embodiments, the data transmission rate of the terminal 100 may be the data transmission rate of the terminal 100 in the process of running a foreground application, for example, the downlink data transmission rate the terminal 100 in the process of running a foreground application. In this case, different foreground applications may correspond to different first thresholds. Herein, the first threshold corresponding to each foreground application may be preset, and no limitation is imposed on the first threshold in this embodiment of this application. For example, Table 1 shows examples of first thresholds corresponding to several applications.

TABLE 1

| Foreground application | First threshold |
| --- | --- |
| Reading class application | 3 Mbps |
| Instant messaging type application | 5 Mbps |
| Text recording type application | 2 Mbps |

It may be understood that there are many possible situations in which event B occurs to the terminal 100, and no limitation is imposed on this in this embodiment of this application. For example, when the terminal 100 is running a video type application, the data transmission rate of the terminal 100 may be less than the first threshold after a video currently viewed by the user is buffered, that is, event B occurs to the terminal 100. For another example, when the terminal 100 is running an audio type application, if the user instructs to pause playing of audio, the data transmission rate of the terminal 100 may be less than the first threshold, that is, event B occurs to the terminal 100.

It may be understood that when event B occurs to the terminal 100, that is, the data transmission rate of the terminal 100 is less than the first threshold, it indicates that requirements for the data transmission rate in the current scenario are not high, and only a small quantity of data streams are required to meet the requirements for the data transmission of the terminal 100.

3. Event C: A strength of a signal sent by the network device 200 and received by the terminal 100 is greater than a second threshold.

The strength of the signal received by the terminal 100 can be measured based on reference signal receiving power (reference signal receiving power, RSRP), reference signal receiving quality (reference signal receiving quality, RSRQ), and a received signal strength indication (received signal strength indication, RSSI). The second threshold may be preset, and no limitation is imposed on the second threshold in this embodiment of this application.

It may be understood that there are many possible situations in which event C occurs to the terminal 100, and no limitation is imposed on this in this embodiment of this application. For example, when the terminal 100 is moving closer to the network device 200, the strength of the signal sent by the network device 200 and received by the terminal 100 may be greater than the second threshold, that is, event C occurs to the terminal 100.

It may be understood that when event C occurs to the terminal 100, that is, the strength of the signal sent by the network device 200 and received by the terminal 100 is relatively high, the terminal 100 can efficiently receive the signal sent by the network device, and therefore only a small quantity of data streams are required to meet requirements for data transmission of the terminal 100.

4. Event D: A screen of the terminal 100 is off.

That the screen is off means that some or all of pixels of a display of the terminal 100 are off.

Figure 4B:
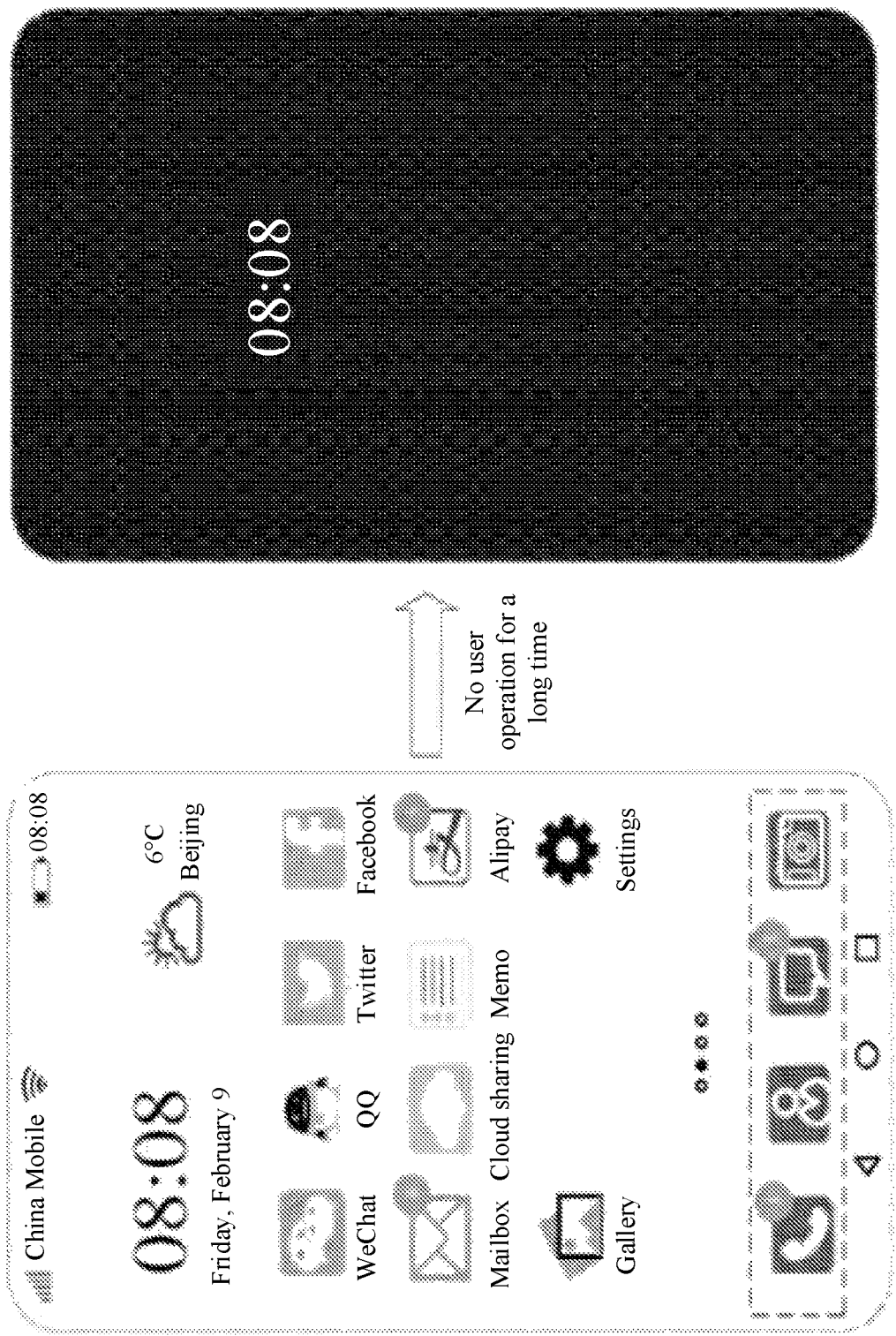

It may be understood that there are many possible situations in which event D occurs to the terminal 100, and no limitation is imposed on this in this embodiment of this application. FIG. 4B shows a scenario in which a screen of the terminal 100 is off. For example, as shown in FIG. 4B, when the terminal 100 does not receive a user operation (including a touch operation acting on the display, a pressing operation acting on a physical key, or a voice instruction that is input) in a preset time period (for example, one minute or 30 seconds), the terminal 100 may turn off some pixels of the display, that is, stop supplying power to these pixels, and display a time only in a small area on the display.

In some other embodiments, the terminal 100 may further turn off all pixels of the display when receiving a user operation (for example, a pressing operation on a power key), that is, stop supplying power to all pixels.

Obviously, when event D occurs to the terminal 100, that is, after the screen of the terminal 100 is off, most of the applications running in the terminal 100 are transferred to the background to run or stop running. In this case, the requirements for data transmission of the terminal 100 are not high, and only a small quantity of data streams are required to meet the requirements.

5. Event E: The terminal 100 enters a "power saving mode".

The "power saving mode" is an operating mode of the terminal. The "power saving mode" refers to a mode in which the terminal 100 executes a series of power saving means for the purpose of saving power and prolonging the standby time. After entering the "power saving mode", the terminal will execute a series of power saving means, such as reducing the performance of a central processing unit (central processing unit, CPU), turning off some unnecessary functions such as reducing a quantity of processing cores, reducing screen brightness, turning off unnecessary applications running in the background (such as GPS positioning), reducing power of the transmitted signal, reducing the volume of audio playing, disabling a Bluetooth function, and disabling mobile data, so as to achieve the purpose of power saving and prolonging the standby time.

The power saving means corresponding to the "power saving mode" of terminals of different manufacturers or different models may be different, and no limitation is imposed on this in this embodiment of this application. The same terminal may also correspond to a plurality of "power saving modes" having different strengths, for example, a "normal power saving mode" and a "super power saving mode" including more power saving means may be included.

It may be understood that the "power saving mode" is only one word used in this embodiment, and its meanings have been described in this embodiment, and its name cannot constitute any limitation to this embodiment. In addition, in some other embodiments of this application, the "power saving mode" may also be referred to as other terms such as "balanced mode".

FIG. 4C(1)-FIG. 4C(2) show a scenario in which the terminal 100 enters a "power saving mode".

A user interface shown in FIG. 4c may be provided by a "settings" application installed on the terminal 100. As shown in the figure, the user interface contains switch controls in two power saving modes: a switch control 401 for a "power saving mode" and a switch control 402 for a "super power saving mode". The control 401 or the control 402 can monitor a user operation, and the terminal 100 can enter the corresponding power saving mode in response to the user operation. For example, as shown in FIG. 4C(1)-FIG. 4C(2), the user can click the switch control 401 for the "power saving mode" to trigger the terminal 100 to enter the "power saving mode".

It may be understood that after the event E occurs to the terminal 100, that is, the terminal 100 enters the "power saving mode", because the terminal 100 executes various power saving means, requirements for data transmission of the terminal 100 should not be high, and only a small quantity of data streams are required to meet the requirements. In addition, after the terminal 100 enters the "power saving mode", a small quantity of data streams are used to transmit data, and power consumption can be further saved, which is equivalent to executing new power saving means.

6. Event F: The terminal 100 is in a non-charging state.

Specifically, the terminal 100 may determine that the terminal is currently in a charging state based on a connection state between a charging port (such as a USB interface) and a peripheral device (such as a charger). Whether the terminal 100 is in a charging state is determined by the user.

It may be understood that when event F occurs to the terminal 100, that is, the terminal 100 is in a non-charging state, the power of the terminal 100 cannot be replenished in time. In this case, a small quantity of data streams may be used to meet requirements for data transmission of the terminal 100, thereby reducing power consumption of the terminal 100.

7. Event G: The temperature of the terminal 100 is greater than a third threshold.

Specifically, the temperature of the terminal 100 may be determined based on data collected by a temperature sensor. The third threshold may be preset, for example, may be 41° C.

It may be understood that there are many possible situations in which event G occurs to the terminal 100, and no limitation is imposed on this in this embodiment of this application. For example, when the terminal 100 continuously runs at a high speed for a long time, or when the terminal 100 is in a high-temperature environment, the temperature of the terminal 100 may be greater than the third threshold, that is, event G may occur to the terminal 100.

It may be understood that when event G occurs to the terminal 100, that is, the temperature of the terminal 100 is greater than the third threshold, because the temperature rises, the terminal 100 will additionally consume more power. In this case, a small quantity of data streams may be used to meet requirements for data transmission of the terminal 100, thereby reducing power consumption of the terminal 100.

(II) High-Speed Scenario

In this embodiment of this application, the high-speed scenario may be any one of a combination of more of the following events: event a: an application that the terminal 100 runs in the foreground is not the first application; event b: a data transmission rate of the terminal 100 is greater than a fourth threshold; event c: a strength of a signal sent by the network device 200 and received by the terminal 100 is less than a fifth threshold; event d: a screen of the terminal 100 is on; event e: the terminal enters a "performance mode"; event f: the terminal 100 is in a charging state; and event g: a temperature of the terminal 100 is less than a sixth threshold.

The following will explain event a to event g one by one:

Event a: An application that the terminal 100 runs in the foreground is not a first application.

Event a and event A are reciprocal events and will not be explained in detail herein.

It may be understood that there are many possible situations in which event a occurs to the terminal 100, and no limitation is imposed on this in this embodiment of this application. For example, the terminal 100 may detect a user operation for exiting the first application. Referring to FIG. 4A, when the terminal 100 runs the "memorandum" application, a sliding operation that is input by a user from the bottom of the display upward may be detected, the home screen is redisplayed in response to the sliding operation, and the "memorandum" application is run in the background.

It may be understood that when event a occurs to the terminal 100, that is, when an application that the terminal 100 runs in the foreground is not the first application, requirements for the data transmission rate is higher, and a larger quantity of data streams are required to meet the requirements for data transmission of the terminal 100.

2. Event b: The data transmission rate of the terminal 100 is greater than a fourth threshold.

Event b is similar to event B and will not be explained in detail herein. Herein, the fourth threshold is greater than or equal to the first threshold in event B. The fourth threshold may be preset, and no limitation is imposed on this in this embodiment of this application.

It may be understood that there are many possible situations in which event b occurs to the terminal 100, and no limitation is imposed on this in this embodiment of this application. For example, when the terminal 100 is running a video type application and the user opens a video link to view a video online, the data transmission rate of the terminal 100 may be greater than the fourth threshold, that is, event b occurs to the terminal 100. For another example, when the terminal 100 is running an audio type application, if the user instructs to play audio online, the data transmission rate of the terminal 100 may be greater than the fourth threshold, that is, event b occurs to the terminal 100.

It may be understood that when event b occurs to the terminal 100, that is, the data transmission rate of the terminal 100 is greater than the fourth threshold, requirements for the data transmission rate are higher, and a larger quantity of data streams are required to meet the requirements for the data transmission of the terminal 100.

3. Event c: A strength of a signal sent by the network device 200 and received by the terminal 100 is less than a fifth threshold.

Event c is similar to event C and will not be explained in detail herein. Herein, the fifth threshold is less than or equal to the second threshold in event C. The fifth threshold may be preset, and no limitation is imposed on this in this embodiment of this application.

It may be understood that there are many possible situations in which event c occurs to the terminal 100, and no limitation is imposed on this in this embodiment of this application. For example, when the terminal 100 moves farther away from the network device 200, the strength of the signal sent by the network device 200 and received by the terminal 100 may be less than the fifth threshold, that is, event c occurs to the terminal 100.

It may be understood that when event c occurs to the terminal 100, that is, the strength of the signal sent by the network device 200 and received by the terminal 100 is relatively low, the terminal 100 can only inefficiently receive the signal sent by the network device, and therefore a larger quantity of data streams are required to meet requirements for data transmission of the terminal 100.

4. Event d: A screen of the terminal 100 is on.

That the screen is on means that some or all pixels of the display of the terminal 100 are lit up. Event d and event D are reciprocal events and will not be explained in detail herein.

It may be understood that there are many possible situations in which event d occurs to the terminal 100, and no limitation is imposed on this in this embodiment of this application. For example, the terminal 100 may light up all pixels of the display when receiving a user operation (for example, a pressing operation on a power key or an operation of lifting the terminal 100), that is, start to supply power to all the pixels. For another example, the terminal 100 may further light up all pixels of the display when detecting an authorized human face.

It may be understood that when event d occurs to the terminal 100, that is, when the screen of the terminal 100 is on, the power of the terminal 100 will be increased, and in this case, requirements for data transmission of the terminal 100 will also be increased, and a larger quantity of data streams are required to meet the requirements.

5. Event e: The terminal enters a "performance mode".

The "performance mode" is an operating mode of the terminal. The "performance mode" refers to a mode in which the terminal 100 performs a series of means to provide optimal user experience without considering power consumption. After entering the "performance mode", the terminal will execute a series of means such as maximizing the running of a CPU, increasing the quantity of processing cores, increasing screen brightness, running applications in the background, increasing power of a transmitted signal, increasing the volume of audio played, enabling a Bluetooth function, and enabling mobile data, thereby providing optimal user experience.

The means corresponding to the "performance mode" of terminals of different manufacturers or different models may be different, and no limitation is imposed on this in this embodiment of this application. The same terminal may also correspond to a plurality of "performance modes" having different strengths, for example, a "normal performance mode" and a "super performance mode" including more means may be included.

The "performance mode" is only one word used in this embodiment, and its meanings have been described in this embodiment, and its name cannot constitute any limitation to this embodiment. In addition, in some other embodiments of this application, the "performance mode" may also be referred to as other terms such as "high-speed mode".

Referring to FIG. 4C(1)-FIG. 4C(2), a user interface shown in FIG. 4C(1)-FIG. 4C(2) may further include a "performance mode" switch control 403. The control 403 may monitor a user operation, and the terminal 100 may enter the performance mode in response to the user operation.

It may be understood that after the event e occurs to the terminal 100, that is, the terminal 100 enters the "performance mode", because the terminal 100 executes various means to ensure user experience, requirements for data transmission of the terminal 100 are higher, and a larger quantity of data streams are required to meet the requirements. In addition, after the terminal enters the "power saving mode", a larger quantity of data streams are used to transmit data, and user experience can be further ensured, which is equivalent to performing new means.

6. Event f: The terminal 100 is in a charging state.

Event f and event F are reciprocal events and will not be explained in detail herein. It may be understood that when event f occurs to the terminal 100, that is, the terminal 100 is in a charging state, the power of the terminal 100 can be replenished in time. In this case, a larger quantity of data streams may be used to meet requirements for data transmission of the terminal 100.

7. Event g: The temperature of the terminal 100 is less than a sixth threshold.

Event g is similar to event G and will not be explained in detail herein. Herein, the sixth threshold is less than or equal to the third threshold in event G. The sixth threshold may be preset, and no limitation is imposed on this in this embodiment of this application.

It may be understood that there are many possible situations in which event g occurs to the terminal 100, and no limitation is imposed on this in this embodiment of this application. For example, when the terminal 100 runs at a low speed, or when the terminal 100 is in a low-temperature environment, the temperature of the terminal 100 may be less than the third threshold, that is, event g may occur to the terminal 100.

It may be understood that when event g occurs to the terminal 100, that is, the temperature of the terminal 100 is less than the sixth threshold, no additional power consumption is caused by temperature, and a larger quantity of data streams may be used to meet requirements for data transmission of the terminal 100.

A method for adjusting a quantity of data streams in a MIMO system according to an embodiment of this application is described below by using four embodiments.

The following four embodiments will be used to describe the technical solutions according to the embodiments of this application in detail mainly by using adjusting the quantity of data streams in the downlink data transmission process in a 5G system in an SA networking mode as an example.

That is, in the following four embodiments, the MIMO system 10 composed of the terminal 100 and the network device 200 is a 5G system in an SA networking mode, that is, both the terminal 100 and the network device 200 support a 5G band and operate on the 5G band, and the network device 200 is connected to a 5G core network (5G core network, 5GC). In addition, the network device 200 is a gNodeB, and the terminal 100 communicates with the network device 200 by using an NR link.

(I) Embodiment 1

In Embodiment 1, a MIMO system may reduce a quantity of data streams in a downlink data transmission process when a terminal 100 is in a low-speed scenario, and restore the quantity of data streams in the downlink data transmission process when the terminal 100 is in a high-speed scenario, thereby dynamically adjusting the quantity of data streams in the downlink data transmission process. In Embodiment 1, the power consumption of the terminal may be reduced and a standby time of the terminal may be prolonged without affecting user experience while the requirements for the data transmission rate of the terminal are met.

Figure 5:
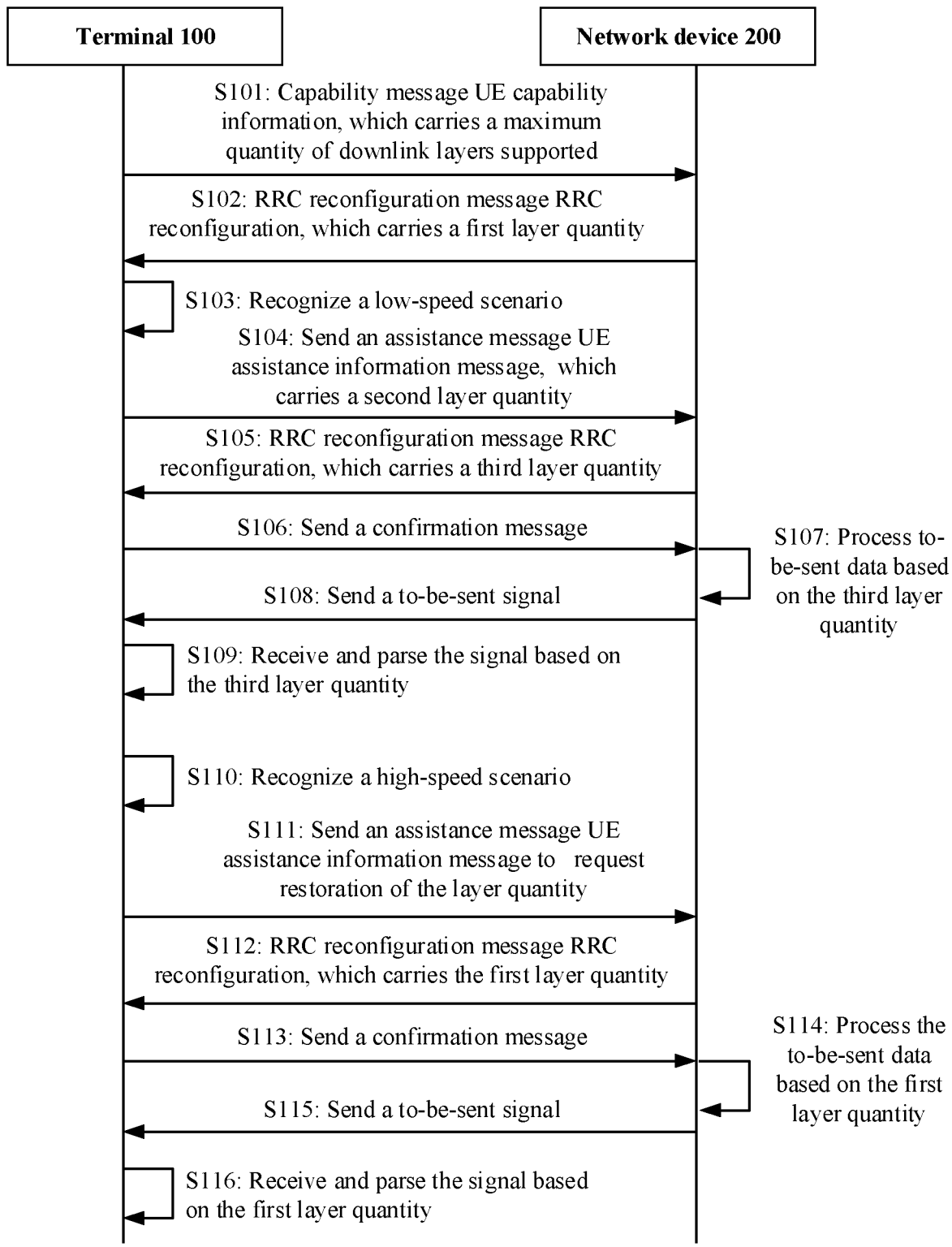
FIG. 5 is a schematic flowchart of a method for adjusting a quantity of downlink data streams in a MIMO system according to an embodiment of this application.

FIG. 5 is an example of a schematic flowchart of a method for adjusting a quantity of downlink data streams in a MIMO system, which is performed in a 5G system in an SA networking mode.

S101: A terminal 100 sends a capability message (UE capability information) to a network device 200, where the capability message carries a maximum quantity of downlink layers supported by the terminal 100.

The terminal 100 may report the capability message in the process of attaching (attach) to the network, or may report the capability message after receiving a capability enquiry message (UE capability enquiry) sent by the network device 200.

The maximum quantity of downlink layers supported by the terminal 100 may be carried in the following capability information element (information element, IE) in the capability message: downlink MIMO capability (MIMO-CapabilityDL-rlO).

The maximum quantity of downlink layers supported by the terminal 100 is determined based on a receiving capability of the terminal 100. The capability of the terminal 100 may include a quantity of antennas configured by the terminal 100 to support a 5G band, a quantity of receiving radio frequency paths configured by the terminal 100, and the like. It may be understood that the maximum quantity of downlink layers supported by the terminal 100 is less than or equal to the quantity of antennas configured by the terminal 100 to support the 5G band, and is also less than or equal to the quantity of receiving radio frequency paths configured by the terminal 100. For example, a maximum quantity of downlink layers supported by the terminal 100 may be 4.

S102: The network device 200 sends an RRC reconfiguration message (RRC reconfiguration) to the terminal 100, where the RRC reconfiguration message carries a first layer quantity, the first layer quantity is less than or equal to the maximum quantity of downlink layers supported by the terminal 100, and the RRC reconfiguration message is used to configure the quantity of layers in the downlink data transmission process.

Then, the downlink data transmission process may be performed between the terminal 100 and the network device 200 based on the first layer quantity. For example, the first layer quantity may be 4.

S103: The terminal 100 recognizes a low-speed scenario.

Specifically, the low-speed scenario may be any one of a combination of more of event A and event B. The low-speed scenario may be preset by the terminal 100 (for example, the low-speed scenario may be preset by the terminal 100 at delivery), or may be set independently by the user.

For example, the low-speed scenario may be a scenario in which event A occurs to the terminal 100, that is, an application that the terminal runs in the foreground is a first application. In a specific example, when the terminal 100 receives a touch operation of the user for clicking an icon of the first application in a home screen, the terminal 100 recognizes the low-speed scenario.

For another example, the low-speed scenario may be a scenario in which event A and event B occur the terminal 100 simultaneously, that is, the terminal 100 runs the first application in the foreground, and the data transmission rate of the terminal 100 is less than the first threshold. In a specific example, when the terminal 100 receives a touch operation of the user for clicking an icon of the first application in a home screen, and the user instructs to pause playing of audio, the terminal 100 recognizes the low-speed scenario.

For another example, the low-speed scenario may be a scenario in which event A, event B, event C, event E and event F occur to the terminal 100 simultaneously, that is, the terminal 100 runs the first application in the foreground, the terminal 100 enters the "power saving mode", a strength of a signal sent by the network device 200 and received by the terminal 100 is greater than a second threshold, the terminal 100 is in a non-charging state, and the data transmission rate of the terminal 100 is less than the first threshold. In a specific example, when the terminal 100 receives a touch operation of the user for clicking the icon of the first application in the home screen, the user instructs to pause playing of audio, the terminal 100 is moving closer to the network device 200, the user clicks a switch control 401 of the "power saving mode", and the user removes a charger from a charging port, the terminal 100 recognizes the low-speed scenario.

For the method for recognizing the low-speed scenario by the terminal 100, refer to detailed descriptions of the low-speed scenario in part (I). Details are not described herein again.

S104 to S106: The terminal 100 and the network device 200 negotiate to reduce the quantity of layers in the downlink data transmission process.

S104: The terminal 100 sends a first message to the network device 200, where the first message is used to request the network device 200 to reduce the quantity of layers in the downlink data transmission process, the first message carries a second layer quantity, and the second layer quantity is the quantity of layers that the terminal 100 needs to use in the downlink data transmission process; and the second layer quantity is less than the first layer quantity.

In some embodiments, the first message may be implemented as an assistance message (UE assistance information message). The assistance message is reported by the terminal 100 through radio resource control (radio resource control, RRC) signaling. The assistance message may be used to reduce the quantity of layers used in data transmission. The description of the UE assistance information message in the protocol is as follows:

---
1. if the UE prefers a configuration primarilyoptimized for power saving:
2 > set powerPrefindication to lowPowerConsumption;
2. else
2 > start or restart T340 with the timervalUE set to the PowerprefindicationTimer;
2 > set PowerprefindicationTimer to normal;

---

The UE shall submit the UE AssistanceInformation message to lower layers for transmission.

The second layer quantity is less than the first layer quantity. For example, the second layer quantity may be 2. In some embodiments, the second layer quantity may be carried in a reducedMIMO-LayerFRI-DL field of the assistance message.

S105: The network device 200 receives the first message, and sends a second message to the terminal 100, where the second message carries a third layer quantity, the third layer quantity is less than or equal to the second layer quantity, and the second message is used to configure the quantity of layers in the downlink data transmission process.

That is, the network device 200 may, in response to the first message, reduce the quantity of layers used in the downlink data transmission process from the first layer quantity to the third layer quantity, thereby reducing the quantity of data streams used in the downlink data transmission process.

In some embodiments, the second message may be implemented as an RRC reconfiguration message (RRC reconfiguration). In some embodiments, the network device 200 may carry the third layer quantity in a maximum layer field (MaxMimoLayerNuni) in a serving cell configuration message (PDSCH-serving cell configuration) sent on a physical downlink shared channel (physical downlink shared channel, PDSCH).

S106: After receiving the second message, the terminal 100 feeds back a confirmation message to the network device 200.

The confirmation message is used to indicate that the terminal 100 has received the second message sent by the network device 200. The confirmation message may be implemented as an RRC reconfiguration complete message (RRC reconfiguration complete).

It may be understood that S106 is an optional step. In some other embodiments, the MIMO system may directly use the third layer quantity to transmit downlink data after performing S103 to S105, without feedback of the confirmation message by the terminal 100. This can reduce signaling interaction and further reduce power consumption.

It may be understood that, the signaling in the existing standard protocol may be reused for the messages (such as the assistance message, the RRC reconfiguration message, and the confirmation message) transmitted between the terminal 100 and the network device 200 in steps S104 to S106, so that the existing communication protocol may be used to transmit, between the terminal 100 and the network device 200, the messages involved in the implementation of this application, which is simple and convenient. Without limitation to this, in some other embodiments, a proprietary protocol may alternatively be used between the terminal 100 and the network device 200 to transmit the foregoing messages, and no limitation is imposed herein.

S107 to S109: The terminal 100 and the network device 200 transmit downlink data based on the negotiated layer quantity after the reduction.

S107: The network device 200 processes, based on the third layer quantity, data to be sent to the terminal 100, to obtain a to-be-sent signal.

Specifically, the data to be sent to the terminal 100 may be text, a picture, a video, a URL, or the like. No limitation is imposed on this in this embodiment of this application.

For the processing the to-be-sent data by the network device 200, refer to FIG. 1A and foregoing related descriptions. The processing may include baseband processing, radio frequency processing, antenna transmission, and the like. The quantity of layers involved in layer mapping in baseband processing is the third layer quantity, and the quantity of sending radio frequency paths used by the network device 200 in radio frequency processing is also equal to the third layer quantity.

S108: The network device 200 sends the to-be-sent signal to the terminal 100.

Specifically, the network device 200 transmits the processed to-be-sent signal by using a plurality of antennas.

S109: The terminal 100 receives the signal sent by the network device 200, and parses the signal based on the third layer quantity.

Specifically, the terminal 100 uses the plurality of antennas to receive the signal sent by the network device 200. In some embodiments, the quantity of antennas used by the terminal 100 when receiving a signal is equal to the third layer quantity. For example, when the third layer quantity is 2, the terminal 100 uses two antennas to receive the signal sent by the network device 200.

After receiving the signal sent by the network device 200, the process of parsing the signal by the terminal 100 may specifically include radio frequency processing and baseband processing. The quantity of receiving radio frequency paths involved in radio frequency processing is equal to the third layer quantity, and the quantity of layers involved in layer mapping in baseband processing is the third layer quantity. For the detailed implementation process of parsing a signal by the terminal 100, refer to FIG. 1B and the foregoing related descriptions.

By performing steps S101 to S109, when in a low-speed scenario, the terminal may request the network device 200 to reduce the quantity of layers used in the downlink data transmission process, thereby reducing the quantity of data streams. This may reduce power consumption of the terminal and prolong a standby time of the terminal without affecting user experience while meeting the requirements for the data transmission rate of the terminal.

In some embodiments, after the MIMO system reduces the quantity of data streams by performing steps S101 to S109, the original quantity of data streams may be further restored when the terminal 100 is in a high-speed scenario. That is, the method according to the embodiment of FIG. 5 may further include the following steps.

S110: The terminal 100 recognizes a high-speed scenario corresponding to the low-speed scenario in S103.

The high-speed scenario may be preset by the terminal 100 (for example, may be preset by the terminal 100 at delivery), or may be set independently by the user. The low-speed scenario in S103 corresponds to the high-speed scenario in S110, and the correspondence will be explained below with an example.

When the low-speed scenario is a scenario in which event A occurs to the terminal 100, the corresponding high-speed scenario is a scenario in which event a occurs to the terminal 100. In a specific example, when the terminal 100 runs the "memorandum" application, if a sliding operation that is input by a user from the bottom of the display upward is detected, a high-speed scenario is recognized. When the low-speed scenario is a scenario in which event B occurs to the terminal 100, the corresponding high-speed scenario is a scenario in which event b occurs to the terminal 100. In a specific example, when the terminal 100 runs a video type application, if the user opens a video link to view a video online, a high-speed scenario is recognized. When the low-speed scenario is a scenario in which event C occurs to the terminal 100, the corresponding high-speed scenario is a scenario in which event c occurs to the terminal 100, and so on.

When a low-speed scenario is a scenario in which event A and event B occur to the terminal 100 simultaneously, a corresponding high-speed scenario is a scenario in which any one or more of event a and event b occur to the terminal 100. When a low-speed scenario is a scenario in which event B and event C occur to the terminal 100 simultaneously, a corresponding high-speed scenario includes a scenario in which any one or more of event b and event c occur to the terminal 100, and so on.

When a low-speed scenario is a scenario in which event A, event B, event C, event E, and event F occur to the terminal 100 simultaneously, a corresponding high-speed scenario is a scenario in which any one or more of event a, event b, event c, event e, and event f occur to the terminal 100, and so on.

For the method for recognizing the high-speed scenario by the terminal 100, refer to detailed descriptions of the high-speed scenario in part (II). Details are not described herein again.

S111 to S113: The terminal 100 and the network device 200 negotiate to restore the quantity of layers in the downlink data transmission process. S111 to S113 are similar to S104 to S106, except that S104 to S106 are used to reduce the quantity of layers, while S111 to S113 are used to restore the quantity of layers.

S111: The terminal 100 sends a third message to the network device 200, where the third message is used to request the network device 200 to restore the quantity of layers in the downlink data transmission process.

In some embodiments, the third message may be implemented as an assistance message (UE assistance information message). Specifically, the assistance message sent by the terminal 100 in S111 may carry no reducedMIMO-Layer-FRLD field, or the reducedMIMO-LayerFRI-DL field is null, so as to request the network device 200 to restore the quantity of layers in the downlink data transmission process. Herein, restoration refers to restoring the quantity of layers in the downlink data transmission process from the third layer quantity after the reduction to the first layer quantity before the reduction.

S112: The network device 200 receives the third message, and sends a fourth message to the terminal 100, where the fourth message carries the first layer quantity and is used to configure the quantity of layers in the downlink data transmission process.

That is, the network device 200 may, in response to the third message, restore the quantity of layers used in the downlink data transmission process from the third layer quantity to the first layer quantity before reduction, thereby increasing the quantity of data streams used in the downlink data transmission process.

In some embodiments, the fourth message may be implemented as an RRC reconfiguration message (RRC reconfiguration).

S113: After receiving the fourth message, the terminal 100 feeds back a confirmation message to the network device 200.

The confirmation message is used to indicate that the terminal 100 has received the fourth message sent by the network device 200. The confirmation message may be implemented as an RRC reconfiguration complete message (RRC reconfiguration complete).

It may be understood that S113 is an optional step. In some other embodiments, the MIMO system may directly use the first layer quantity to transmit downlink data after performing S113, without feedback of the confirmation message by the terminal 100. This can reduce signaling interaction and further reduce power consumption.

It may be understood that, the signaling in the existing standard protocol may be reused for the messages (such as the first message, the second reconfiguration message, and the confirmation message) transmitted between the terminal 100 and the network device 200 in steps S111 to S113, so that the existing communication protocol may be used to transmit, between the terminal 100 and the network device 200, the messages involved in the implementation of this application, which is simple and convenient. Without limitation to this, in some other embodiments, a proprietary protocol may alternatively be used between the terminal 100 and the network device 200 to transmit the foregoing messages, and no limitation is imposed herein.

S114: The network device 200 processes, based on the first layer quantity, data to be sent to the terminal 100, to obtain a to-be-sent signal.

S115: The network device 200 sends the to-be-sent signal to the terminal 100.

S116: The terminal 100 receives the signal sent by the network device 200, and parses the signal based on the first layer quantity.

For the specific implementation of S114 to S116, refer to related descriptions in S107 to S109. Details are not described herein again.

In the embodiment of FIG. 5, the signal sent by the network device 200 to the terminal 100 may also be referred to as a downlink signal.

By performing steps S110 to S116, when in a high-speed scenario, the terminal may request the network device 200 to restore the quantity of layers used in the downlink data transmission process, thereby increasing the quantity of data streams. In this way, the quantity of data streams can be flexibly adjusted, so as to meet the requirements for the data transmission rate of the terminal in the high-speed scenario and improve user experience.

The method embodiment shown in FIG. 5 shows the process of adjusting the quantity of data streams in two downlink data transmission processes performed by the MIMO system. In specific implementation, the MIMO system may alternatively adjust the quantity of data streams in the downlink data transmission process for more times. No limitation is imposed on this in this embodiment of this application. For example, after S116, the MIMO system may further recognize the low-speed scenario again and reduce the quantity of data streams in the downlink data transmission process for the second time, and then the MIMO system may further recognize the high-speed scenario again and restore the quantity of data streams for the second time in the downlink data transmission process.

Figure 6A:
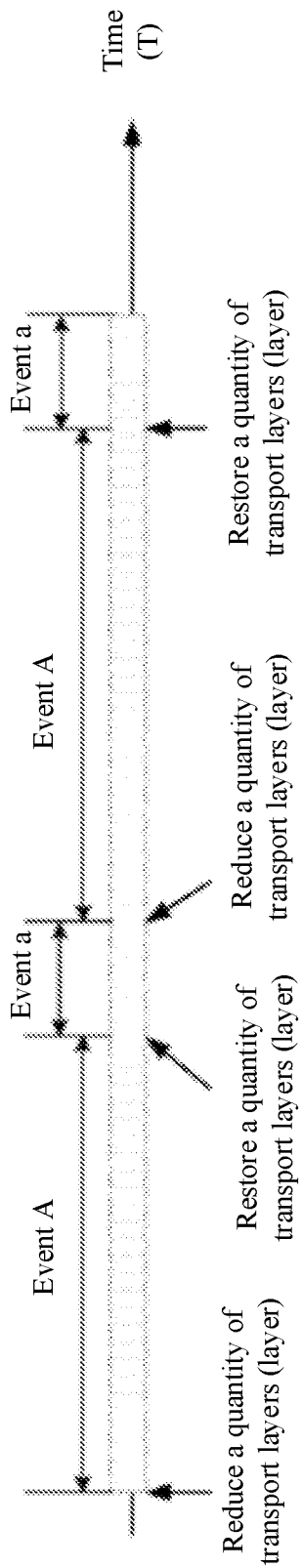
FIG. 6A and FIG. 6B are schematic diagrams of time nodes for adjusting a quantity of downlink data streams in a MIMO system according to Embodiment 1.
Figure 6B:
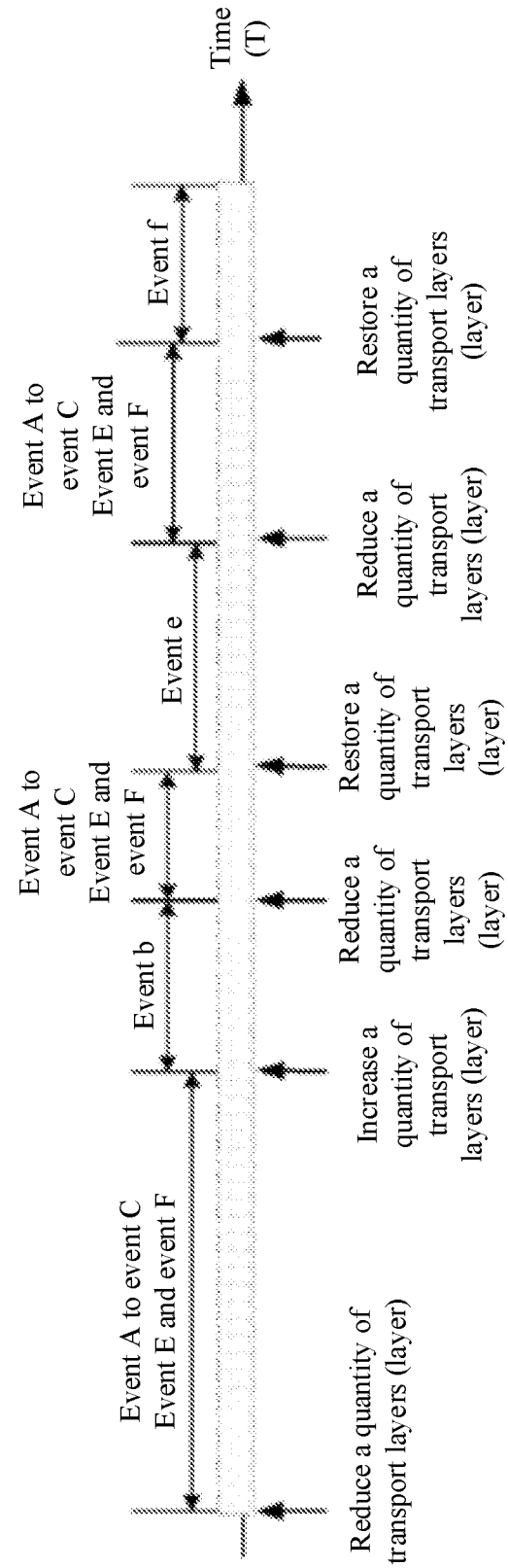

Referring to FIG. 6A and FIG. 6B, to better understand the solution of Embodiment 1 shown in FIG. 5, two examples are further provided in this embodiment of this application.

FIG. 6A shows, when the low-speed scenario is a scenario in which event A occurs to the terminal 100, an example of time periods or time points at which each event occurs to the terminal 100, and time points at which the MIMO system switches the quantity of layers in the downlink communication process.

FIG. 6B shows, when the low-speed scenario is a scenario in which event A, event B, event C, event E, and event F occur to the terminal 100 simultaneously, an example of time periods or time points at which each event occurs to the terminal 100, and time points at which the MIMO system switches the quantity of layers in the downlink communication process.

It may be learned from FIG. 6A and FIG. 6B that the MIMO system in Embodiment 1 immediately adjusts the quantity of layers in the downlink data transmission process when the terminal 100 is in a low-speed scenario or a high-speed scenario.

(II) Embodiment 2

Embodiment 2 differs from Embodiment 1 in that an interval between two consecutive adjustments of the quantity of data streams in the downlink data transmission process by the MIMO system is greater than or equal to the first duration. This can prevent a situation in which the terminal 100 is frequently switched between a low-speed scenario and a high-speed scenario, so that the MIMO system will not frequently adjust the quantity of data streams in the downlink data transmission process. In addition, in Embodiment 2, power consumption of the terminal may be reduced and a standby time of the terminal may be prolonged without affecting user experience while the requirements for the data transmission rate of the terminal are met.

Figure 7:
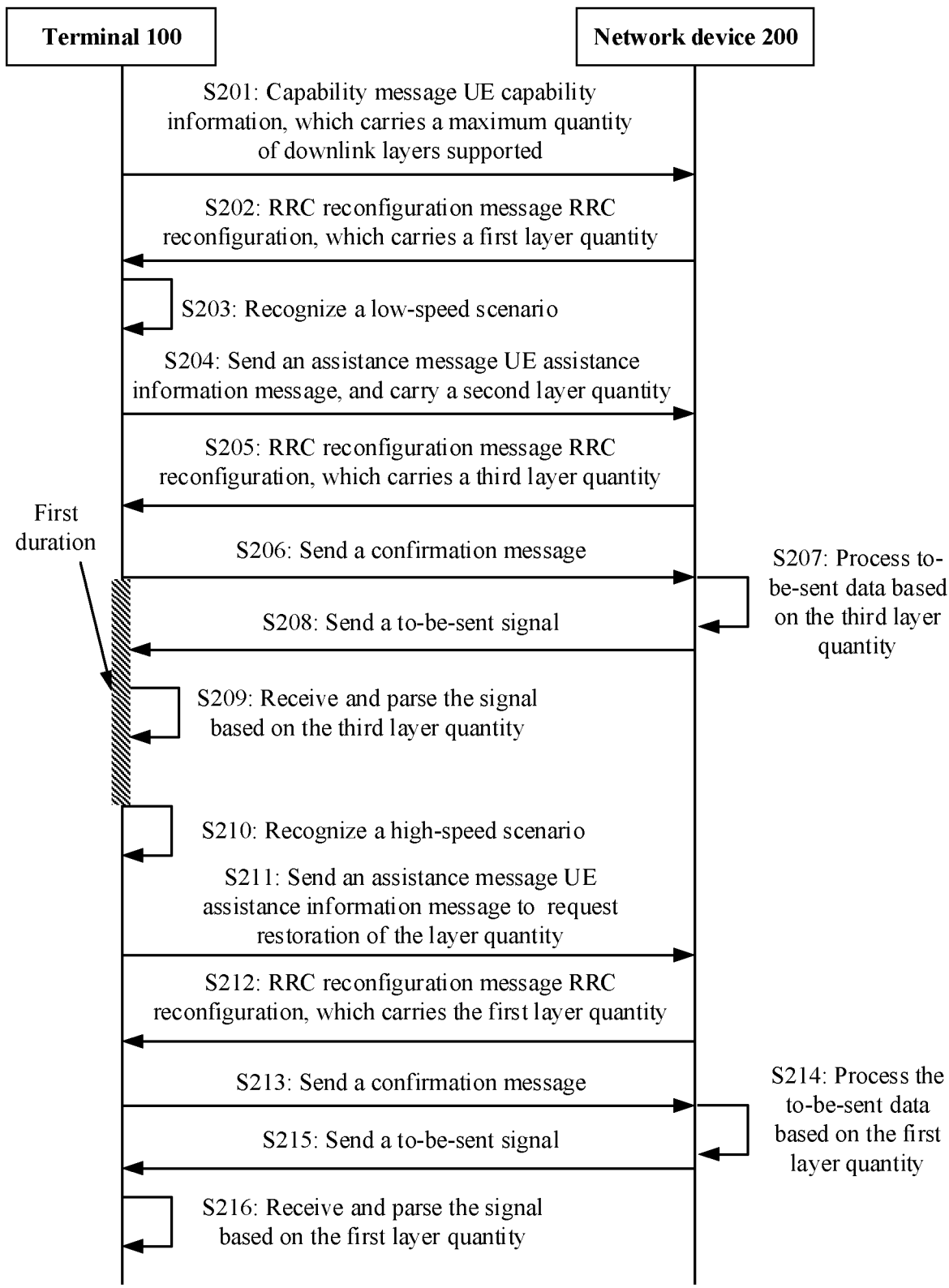
FIG. 7 is a schematic flowchart of a method for adjusting a quantity of downlink data streams in a MIMO system according to an embodiment of this application.

FIG. 7 is a schematic flowchart of another method for adjusting a quantity of data streams, which is performed in a 5G system in an SA networking mode, according to an embodiment of this application.

FIG. 7 differs from FIG. 5 in that after the terminal 100 and the network device 200 negotiate to reduce the quantity of layers in the downlink data transmission process, only after the first duration, the terminal 100 and the network device 200 can start to recognize the high-speed scenario and perform an operation after the high-speed scenario is recognized.

Specifically, a start time of the first duration may be a time point when the MIM system performs any one of steps S204, S205, and S206. In some embodiments, the terminal 100 may enable a timer (timer) at S204 (that is, sending an assistance message) or S205 (that is, receiving an RRC reconfiguration message) or S206 (that is, sending a confirmation message), and recognize the current scenario when the timer expires. The duration of the timer (timer) is the first duration. The first duration may be preset, for example, may be one minute or two minutes. No limitation is imposed on this in this embodiment of this application.

In some other embodiments, the MIMO system may not control an interval between two consecutive adjustments of the quantity of data streams in the downlink data transmission process to be greater than or equal to the first duration, but only control an interval between each time when the quantity of data streams is reduced and next time when the quantity of data streams is restored to be greater than or equal to the first duration, or only control an interval between each time when the quantity of data streams is restored and next time when the quantity of data streams is reduced to be greater than or equal to the first duration. This may reduce the use of the timer, and reduce power consumption of the terminal and prolong a standby time of the terminal without affecting user experience while meeting the requirements for the data transmission rate of the terminal.

Figure 8A:
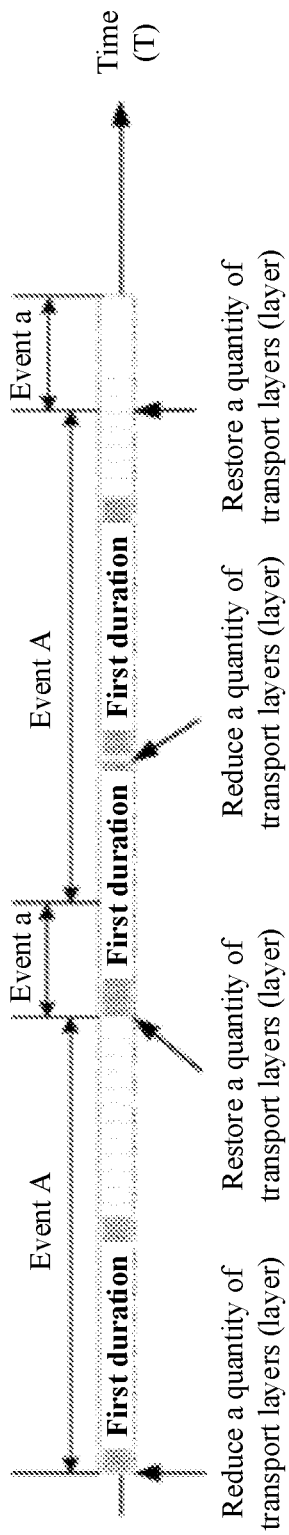
FIG. 8A and FIG. 8B are schematic diagrams of time nodes for adjusting a quantity of downlink data streams in a MIMO system according to Embodiment 2.
Figure 8B:
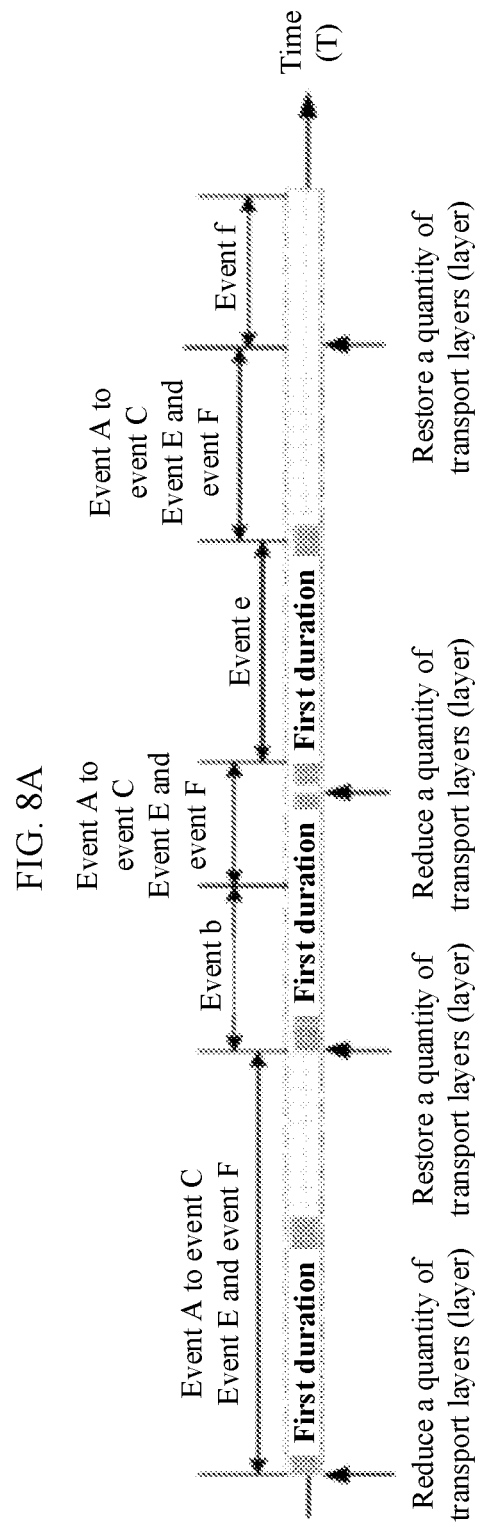

Referring to FIG. 8A and FIG. 8B, to better understand the solution of Embodiment 2 shown in FIG. 7, two examples are further provided in this embodiment of this application.

FIG. 8A shows, when the low-speed scenario is a scenario in which event A occurs to the terminal 100, an example of time periods or time points at which each event occurs to the terminal 100, and time points at which the MIMO system switches the quantity of layers in the downlink communication process. Compared with that in FIG. 6A, although the time points when each event occurs to the terminal 100 is the same, an interval between two consecutive switching actions of the quantity of layers in FIG. 8A is greater than or equal to the first duration, which avoids frequent switching.

FIG. 8B shows, when the low-speed scenario is a scenario in which event A, event B, event C, event E, and event F occur to the terminal 100 simultaneously, an example of time periods or time points at which each event occurs to the terminal 100, and time points at which the MIMO system switches the quantity of layers in the downlink communication process. Compared with that in FIG. 6B, although the time points when each event occurs to the terminal 100 is the same, an interval between two consecutive switching actions of the quantity of layers in FIG. 8B is greater than or equal to the first duration, which avoids frequent switching.

It may be learned from FIG. 8A and FIG. 8B that the interval between two consecutive adjustments of the quantity of layers in the downlink data transmission process by the MIMO system in Embodiment 2 is greater than the first duration.

(III) Embodiment 3

To provide better user experience, in second duration when the terminal 100 runs the first application in the foreground, it is usually ensured that the terminal 100 has a higher data transmission rate in the second duration, so as to improve user experience. This requires that the MIMO system does not reduce the quantity of data streams in the downlink data transmission process in the second duration when the terminal 100 runs the first application in the foreground. Embodiment 3 is provided to achieve this purpose.

In Embodiment 3, when the low-speed scenario includes event A, the terminal 100 starts to recognize the low-speed scenario after the event A lasts for the second duration, and in the case of recognizing the low-speed scenario, negotiates with the network device 200 to reduce the quantity of layers in the downlink data transmission process. In Embodiment 3, it can be ensured that the quantity of data streams in the downlink data transmission process will not be reduced in the second duration when the terminal 100 runs the first application in the foreground, so as to ensure that the terminal 100 has a higher data transmission rate in the second duration, thereby improving user experience.

Figure 9:
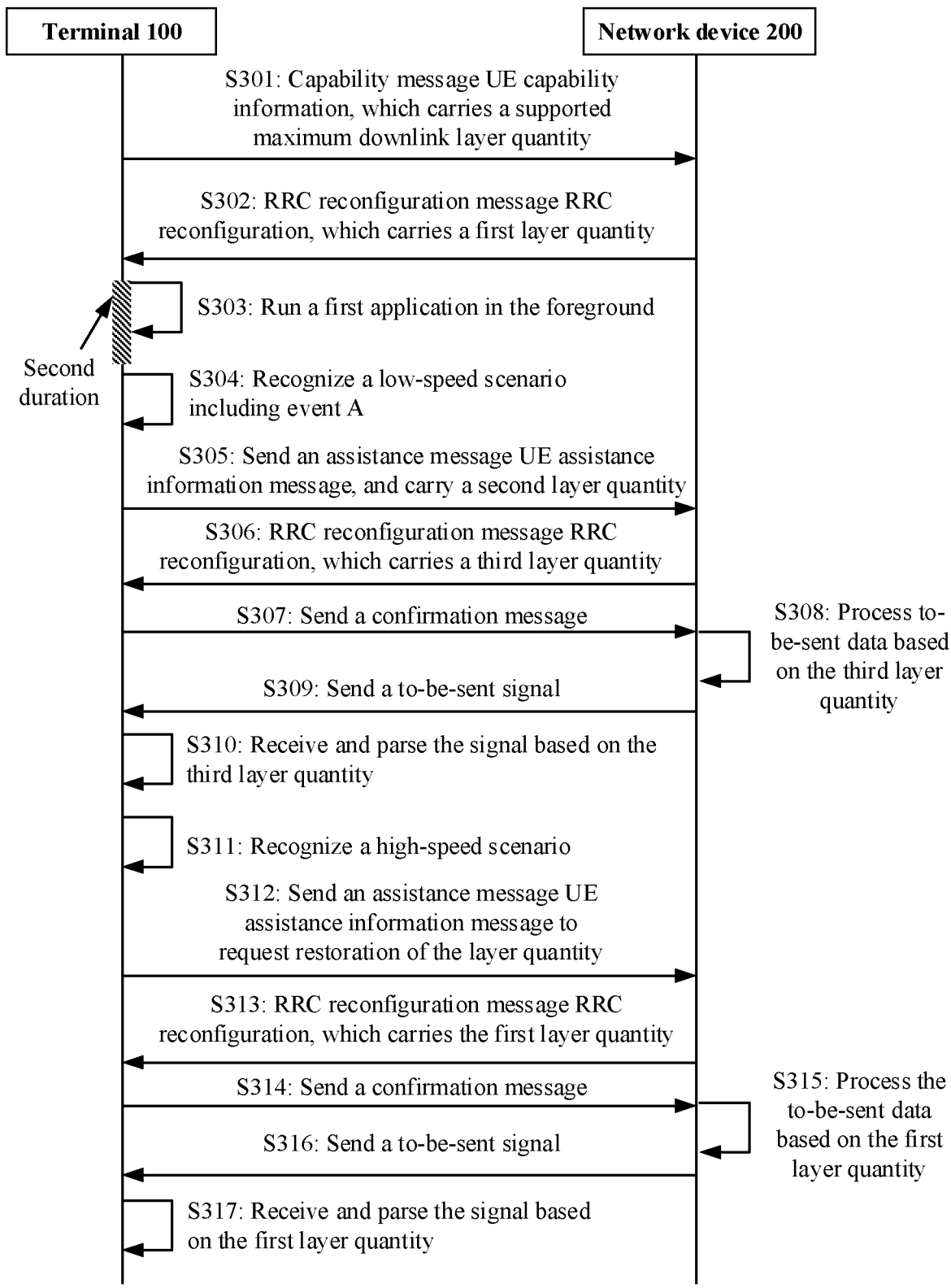
FIG. 9 is a schematic flowchart of a method for adjusting a quantity of downlink data streams in a MIMO system according to an embodiment of this application.

As shown in FIG. 9, the method may include the following steps.

S301 and S302: Reference may be made to S101 and S102.

S303: The terminal 100 starts to run a first application in the foreground.

Specifically, the terminal 100 may start to run the first application in the foreground in response to a touch operation of the user for clicking an icon of the first application in a home screen. Without limitation to this, the terminal 100 may further start to run the first application in the foreground in response to a voice instruction, a shaking instruction, or the like. No limitation is imposed on this in this embodiment of this application.

S304: After second duration, the terminal 100 recognizes a low-speed scenario, where the low-speed scenario includes event A.

Specifically, a start time of the second duration may be a time point when the terminal 100 starts to run the first application in the foreground, that is, a start time point of S303. In some embodiments, the terminal 100 may enable a timer (timer) when running the first application in the foreground, and recognize the current scenario when the timer expires. The duration of the timer (timer) is the second duration. The second duration may be preset, for example, may be 30 seconds or one minute. No limitation is imposed on this in this embodiment of this application.

For S305 to S317, refer to S104 to S116 in the embodiment of FIG. 5. Details are not described herein again.

The method embodiment shown in FIG. 9 shows the process of adjusting the quantity of data streams in two downlink data transmission processes performed by the MIMO system. In specific implementation, the MIMO system may alternatively adjust the quantity of data streams in the downlink data transmission process for more times. No limitation is imposed on this in this embodiment of this application.

Figure 10:
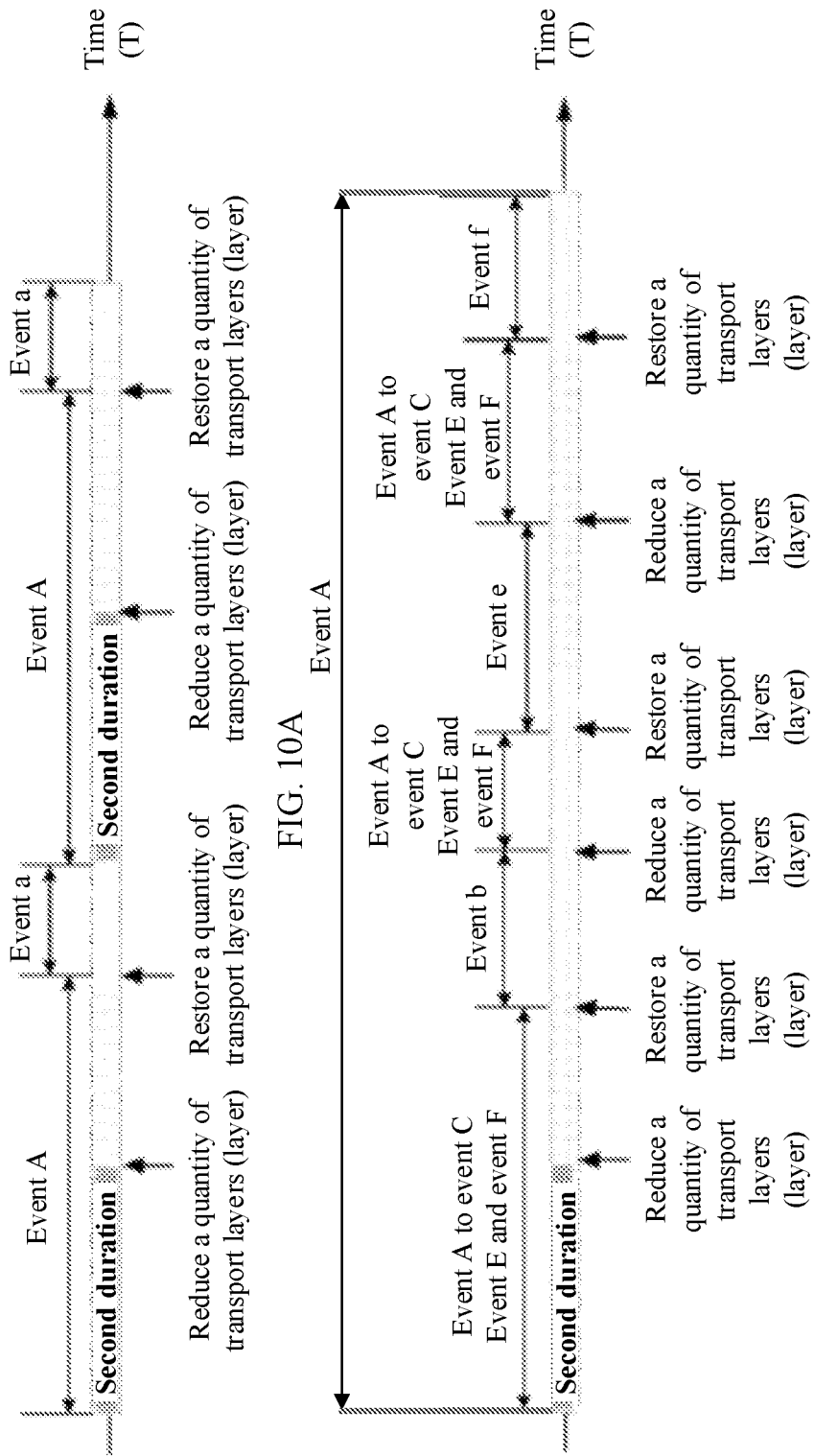
FIG. 10A and FIG. 10B are schematic diagrams of time nodes for adjusting a quantity of downlink data streams in a MIMO system according to Embodiment 3.

Referring to FIG. 10A and FIG. 10B, to better understand the solution of Embodiment 3 shown in FIG. 9, two examples are further provided in this embodiment of this application.

FIG. 10A shows, when the low-speed scenario is a scenario in which event A occurs to the terminal 100, an example of time periods or time points at which each event occurs to the terminal 100, and time points at which the MIMO system switches the quantity of layers in the downlink communication process. Compared with that in FIG. 6A, although the time points when each event occurs to the terminal 100 are the same, in FIG. 10A, the MIMO system will not reduce the quantity of data streams in the downlink data transmission process in the second duration when the terminal 100 runs the first application in the foreground.

FIG. 10B shows, when the low-speed scenario is a scenario in which event A, event B, event C, event E, and event F occur to the terminal 100 simultaneously, an example of time periods or time points at which each event occurs to the terminal 100, and time points at which the MIMO system switches the quantity of layers in the downlink communication process. Compared with that in FIG. 6B, although the time points when each event occurs to the terminal 100 are the same, in FIG. 10B, the MIMO system will not reduce the quantity of data streams in the downlink data transmission process in the second duration when the terminal 100 runs the first application in the foreground.

It may be learned from FIG. 10A and FIG. 10B that the interval between two consecutive adjustments of the quantity of layers in the downlink data transmission process by the MIMO system in Embodiment 2 is greater than the first duration.

It may be understood that Embodiment 2 and Embodiment 3 of the embodiments of this application may be implemented in combination.

(IV) Embodiment 4

Embodiment 1 to Embodiment 3 describe the method in which the MIMO system adjusts the quantity of data streams in the downlink data transmission process, but embodiments are not limited thereto. The embodiments of this application are also applicable to that the MIMO system adjusts the quantity of data streams in the uplink data transmission process.

In the uplink data transmission process, roles of the terminal and the network device are interchangeable. The terminal is a signal transmitting end, and the network device is a signal receiving end. The terminal converts the input data stream into several paths of parallel signals which are transmitted from a plurality of transmitting antennas simultaneously, respectively; and a plurality of receiving antennas of the network device receive the signals and restore original signals.

In Embodiment 4, a MIMO system may reduce a quantity of data streams in an uplink data transmission process when a terminal 100 is in a low-speed scenario, and restore the quantity of data streams in the uplink data transmission process when the terminal 100 is in a high-speed scenario, thereby dynamically adjusting the quantity of data streams in the uplink data transmission process. Herein, the method in which the MIMO system adjusts (reduces or restores) the quantity of data streams in the uplink data transmission process is similar to the method in which the MIMO system adjusts (reduces or restores) the quantity of data streams in the downlink data transmission process.

Figure 11:
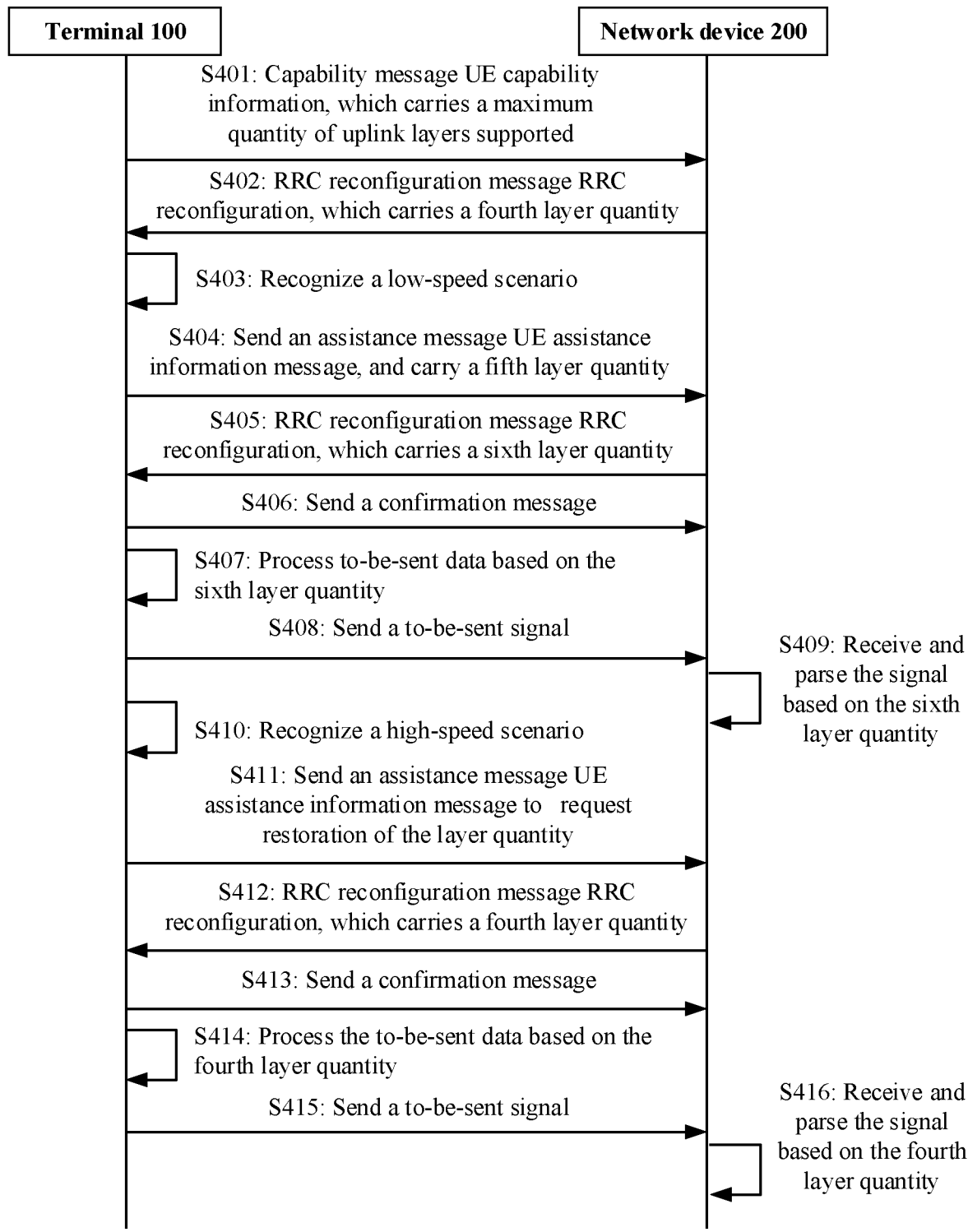
FIG. 11 is a schematic flowchart of a method for adjusting a quantity of uplink data streams in a MIMO system according to an embodiment of this application.

FIG. 11 is an example of a schematic flowchart of a method for adjusting a quantity of uplink data streams in a MIMO system, which is performed in a 5G system in an SA networking mode.

S401: A terminal 100 sends a capability message (UE capability information) to a network device 200, where the capability message carries a maximum quantity of uplink layers supported by the terminal 100.

For the capability message, refer to related descriptions in Embodiment 1.

The maximum quantity of uplink layers supported by the terminal 100 is determined based on a sending capability of the terminal 100. The capability of the terminal 100 may include a quantity of antennas configured by the terminal 100 to support a 5G band, a quantity of sending radio frequency paths configured by the terminal 100, and the like. It may be understood that the maximum quantity of uplink layers supported by the terminal 100 is less than or equal to the quantity of antennas configured by the terminal 100 to support the 5G band, and is also less than or equal to the quantity of sending radio frequency paths configured by the terminal 100. For example, a maximum quantity of uplink layers supported by the terminal 100 may be 2.

S402: The network device 200 sends an RRC reconfiguration message (RRC reconfiguration) to the terminal 100, where the RRC reconfiguration message carries a fourth layer quantity, the fourth layer quantity is less than or equal to the maximum quantity of uplink layers supported by the terminal 100, and the RRC reconfiguration message is used to configure the quantity of layers in the uplink data transmission process.

For example, the fourth layer quantity may be 2.

S403: The terminal 100 recognizes a low-speed scenario.

S404 to S406: The terminal 100 and the network device 200 negotiate to reduce the quantity of layers in the uplink data transmission process.

S404: The terminal 100 sends a first message to the network device 200, where the first message is used to request the network device 200 to reduce the quantity of layers in the uplink data transmission process, the first message carries a fifth layer quantity, and the fifth layer quantity is the quantity of layers that the terminal 100 needs to use in the uplink data transmission process; and the fifth layer quantity is less than the fourth layer quantity.

In some embodiments, the first message may be implemented as an assistance message (UE assistance information message). For the specific implementation of the assistance message, refer to related descriptions in S104.

In some embodiments, the fifth layer quantity may be carried in the reducedMIMO-LayerFRI-UL field of the assistance message.

S405: The network device 200 receives the first message, and sends a second message to the terminal 100, where the second message carries a sixth layer quantity, the sixth layer quantity is less than or equal to the fifth layer quantity, and the second message is used to configure the quantity of layers in the uplink data transmission process.

That is, the network device 200 may, in response to the first message, reduce the quantity of layers used in the uplink data transmission process from the fourth layer quantity to the sixth layer quantity, thereby reducing the quantity of data streams used in the uplink data transmission process.

In some embodiments, the second message may be implemented as an RRC reconfiguration message (RRC reconfiguration). In some embodiments, the network device 200 may carry the third layer quantity in a maximum layer field (MaxMimoLayerNuni) in a serving cell configuration message (PDSCH-serving cell configuration) sent on a physical uplink shared channel (physical uplink shared channel, PDSCH).

S406: After receiving the second message, the terminal 100 feeds back a confirmation message to the network device 200.

S407 to S409: The terminal 100 and the network device 200 transmit uplink data based on the negotiated sixth layer quantity after reduction.

S410: The terminal 100 recognizes a high-speed scenario corresponding to the low-speed scenario in S103.

S411 to S413: The terminal 100 and the network device 200 negotiate to restore the quantity of layers in the uplink data transmission process.

S411: The terminal 100 sends a third message to the network device 200, where the third message is used to request the network device 200 to restore the quantity of layers in the uplink data transmission process.

In some embodiments, the third message may be implemented as an assistance message (UE assistance information message). Specifically, the assistance message sent by the terminal 100 in S411 may carry no reducedMIMO-LayerFRI-UL field, or the reducedMIMO-LayerFRI-UL field is null, so as to request the network device 200 to restore the quantity of layers in the uplink data transmission process. Herein, restoration refers to restoring the quantity of layers in the uplink data transmission process from the sixth layer quantity after the reduction to the fourth layer quantity before the reduction.

S412: The network device 200 receives the third message, and sends a fourth message to the terminal 100, where the fourth message carries the fourth layer quantity and is used to configure the quantity of layers in the uplink data transmission process.

In some embodiments, the fourth message may be implemented as an RRC reconfiguration message (RRC reconfiguration).

S413: After receiving the fourth message, the terminal 100 feeds back a confirmation message to the network device 200.

S414: The terminal 100 processes, based on the fourth layer quantity, data to be sent to the network device 200, to obtain a to-be-sent signal.

S415: The terminal 100 sends the to-be-sent signal to the network device 200.

S416: The network device 200 receives the signal sent by the terminal 100, and parses the signal based on the fourth layer quantity.

In the embodiment of FIG. 11, the signal sent by the terminal 100 to the network device 200 may also be referred to as an uplink signal.

It may be understood that Embodiment 1 and Embodiment 4 may be implemented in combination, and the same message may implement the function in Embodiment 1 and Embodiment 4. The capability message sent by the terminal 100 to the network device 200 may carry the maximum quantity of downlink layers supported by the terminal 100 and the maximum quantity of uplink layers supported by the terminal 100, and the first message sent by the terminal 100 to the network device 200 after the terminal recognizes the low-speed scenario may carry the second layer quantity and the fifth layer quantity. The second message sent by the network device 200 to the terminal in response to the first message may carry the third layer quantity and the sixth layer quantity, the third message sent by the terminal 100 to the network device 200 after the terminal recognizes the high-speed scenario may be used to request restoration of the uplink layer quantity and the downlink layer quantity, and the fourth message sent by the network device 200 to the terminal in response to the third message may carry the first layer quantity and the fourth layer quantity.

It may be understood that the ideas in Embodiment 2 and Embodiment 3 may also be applied to the method for adjusting the quantity of uplink data streams in Embodiment 4.

That is, in some embodiments, an interval between two consecutive adjustments of the quantity of data streams in the uplink data transmission process by the MIMO system is greater than or equal to the first duration. This can prevent a situation in which the terminal 100 is frequently switched between a low-speed scenario and a high-speed scenario, so that the MIMO system will not frequently adjust the quantity of data streams in the uplink data transmission process. For details, refer to related descriptions in Embodiment 2.

In some embodiments, when the low-speed scenario includes event A, the terminal 100 starts to recognize the low-speed scenario after the event A lasts for the second duration, and in the case of recognizing the low-speed scenario, negotiates with the network device 200 to reduce the quantity of layers in the uplink data transmission process. For details, refer to related descriptions in the embodiments.

In addition to the 5G system in an SA networking mode described in Embodiment 1 to Embodiment 4, the technical solutions according to the embodiments of this application are also applicable to a 5G system in an NSA networking mode. When the MIMO system shown in FIG. 2 is a 5G system in an NSA networking mode, the system may further include a network device 300, where the network device 200 may be an eNodeB, and the network device 300 may be a gNodeB. The terminal 100 communicates with the network device 200 by using an LTE link, and the terminal 100 further communicates with the network device 300 by using an NR link to implement dual connectivity. In addition, the network device 200 is connected to the network device 300, and both the network device 200 and the network device 300 are connected to a 4G core network (evolved packet core, EPC).

The 5G system in an NSA networking mode is also applicable to the method for adjusting a quantity of data streams according to the embodiment of this application, that is, the quantity of data streams used in the data transmission process between the network device 300 and the terminal 100 can also be adjusted. In an implementation, when the quantity of data streams between the network device 300 and the terminal 100 is adjusted, for the interaction process between the network device 300 and the terminal 100, refer to related descriptions in Embodiment 1 to Embodiment 3. The difference is that messages (such as the first message, the second message, the third message, and the fourth message) exchanged between the network device 300 and the terminal 100 are all transmitted by using the network device 200. In another implementation, when the quantity of data streams between the network device 300 and the terminal 100 is adjusted, for the interaction process between the network device 300 and the terminal 100, refer to related descriptions in Embodiment 1 to Embodiment 3. The network device 300 and the terminal 100 can directly exchange messages (such as the first message, the second message, the third message, and the fourth message described above).

In addition to the 5G system in an SA networking mode described above, the technical solutions according to the embodiments of this application are also applicable to an LTE system. In the LTE system, both the terminal 100 and the network device 200 support a 4G band and operate on the 4G band, and the network device 200 is connected to the EPC. In addition, the network device 200 is an eNodeB, and the terminal 100 communicates with the network device 200 by using an LTE link. When the method for adjusting a quantity of data streams according to the embodiment of this application is applied in the LTE system, for the interaction process between the network device 200 and the terminal 100, refer to related descriptions in Embodiment 1 to Embodiment 3. Details are not described herein again.

In the embodiment of this application, the first layer quantity is the first transport layer quantity, the second layer quantity is the second transport layer quantity, the third layer quantity is the third transport layer quantity, the fourth layer quantity is the fourth transport layer quantity, the fifth layer quantity is the fifth transport layer quantity, and the sixth layer quantity is the sixth transport layer quantity.

The various implementations of this application may be arbitrarily combined to achieve different technical effects.

The foregoing embodiments may be implemented in whole or in part by using software, hardware, firmware or any combination thereof. When implemented by using software, the embodiments may be implemented in whole or in part in the form of a computer program product. The computer program product includes one or more computer instructions. When the computer program instructions are loaded and executed on a computer, all or some of the processes or functions according to this application are generated. The computer may be a general-purpose computer, a special-purpose computer, a computer network, or another programmable apparatus. The computer instructions may be stored in a computer readable storage medium, or transmitted from one computer readable storage medium to another computer readable storage medium. For example, the computer instructions may be transmitted from one website site, computer, server or data center to another website, computer, server or data center in a wired (for example, a coaxial cable, an optical fiber, or a digital subscriber line) or wireless (for example, infrared, radio, or microwave) manner. The computer readable storage medium may be any available medium that can be accessed by a computer or a data storage device such as a server or a data center that includes one or an integration of more available media. The available medium may be a magnetic medium (for example, a floppy disk, a hard disk or a magnetic tape), an optical medium (for example, DVD), a semiconductor medium (for example, a solid state disk Solid State Disk), or the like.

A person of ordinary skill in the art may understand that all or some processes in implementing the method of the foregoing embodiment may be completed by using a computer program to instruct related hardware. The program may be stored in a computer readable storage medium. The program, when executed, may include processes of the method embodiments described above. The foregoing storage medium includes: various media that can store program code, such as an ROM, a random access memory RAM, a magnetic disk, or an optical disk.

In conclusion, the above mentioned are only embodiments of the technical solutions of the present invention, and are not intended to limit the protection scope of the present invention. Any modification, equivalent replacement, improvement, and the like made based on the disclosure of the present invention shall fall within the protection scope of the present invention.

What is claimed is:

1. A method comprising:
receiving, by a terminal of a multiple-input multiple-output (MIMO) system, a downlink signal from a network device of the MIMO system based on a first transport layer quantity;
recognizing, by the terminal, a first scenario and sending a first message to the network device, wherein the first message is to request the network device to reduce a quantity of transport layers used in a downlink data transmission process, wherein the first message carries a second transport layer quantity, wherein the second transport layer quantity is less than the first transport layer quantity, wherein the first scenario comprises one or more of the terminal running a first application in a foreground of the terminal, a data transmission rate of the terminal being less than a first threshold, a strength of a signal from the network device and received by the terminal being greater than a second threshold;
receiving, by the terminal, a second message from the network device, wherein the second message is to configure a quantity of transport layers in the downlink data transmission process, wherein the second message carries a third transport layer quantity, and wherein the third transport layer quantity is less than or equal to the second transport layer quantity; and receiving and parsing, by the terminal, a downlink signal from the network device based on the third transport layer quantity.

2. The method of claim 1, wherein the first scenario comprises one or more of a group consisting of: a screen of the terminal being off, the terminal entering a power saving mode, the terminal being in a non-charging state, and a temperature of the terminal being greater than a third threshold.

3. The method of claim 2, wherein the terminal running the first application in the foreground comprises receiving, by the terminal, a user operation acting on an icon of the first application in a home screen;

wherein the strength of the signal from the network device being greater than the second threshold comprises detecting, by the terminal, that a reference signal received power (RSRP) or a reference signal received quality (RSRQ) is greater than the second threshold;

wherein the screen of the terminal being off comprises receiving, by the terminal, no user operation for a preset duration when the screen is on, or receiving, by the terminal, a pressing operation acting on a power key when the screen is on; and wherein the terminal entering the power saving mode comprises receiving, by the terminal, a user operation acting on a switch control of power saving mode.

4. The method of claim 1, wherein the downlink signal is a first downlink signal, and wherein after receiving and parsing the first downlink signal, the method further comprises:

recognizing, by the terminal, a second scenario corresponding to the first scenario, and sending a third message to the network device, wherein the third message is to request the network device to restore a quantity of transport layers used in the downlink data transmission process;

receiving, by the terminal, a fourth message from the network device, wherein the fourth message is to configure a quantity of transport layers in the downlink data transmission process, and wherein the fourth message carries the first transport layer quantity; and receiving and parsing, by the terminal, a second downlink signal from the network device based on the first transport layer quantity.

5. The method of claim 4, wherein the second scenario comprises one or more of a group consisting of: the terminal running a second application in the foreground other than a first application associated with the first scenario, a data transmission rate of the terminal being greater than a fourth threshold, a strength of a signal from the network device and received by the terminal being less than a fifth threshold, a screen of the terminal being on, the terminal entering a performance mode, the terminal being in a charging state, and a temperature of the terminal being less than a sixth threshold.

6. The method of claim 5, wherein the terminal running the second application in the foreground comprises receiving, by the terminal, a user operation for exiting the first application in the process of running the first application;

wherein the strength of the signal from the network device being less than the fifth threshold comprises detecting, by the terminal, that a reference signal received power (RSRP) or a reference signal received quality (RSRQ) is less than the fifth threshold;

wherein the screen of the terminal being on comprises receiving, by the terminal, a pressing operation acting on a power key when the screen is off; and wherein the terminal entering the performance mode comprises receiving, by the terminal, a user operation acting on a switch control of performance mode.

7. The method of claim 4, wherein a duration between a time when the terminal receives the second message and a time when the terminal recognizes the second scenario is greater than or equal to a first duration.

8. The method of claim 1, wherein the first scenario is based on the terminal running the first application in the foreground, and wherein a duration between a time when the terminal starts to run the first application in the foreground and a time when the terminal recognizes the first scenario is greater than or equal to a second duration.

9. The method of claim 1, wherein the first message is a user equipment (UE) assistance information message, and the second transport layer quantity is carried in a reduced MIMO-LayerFRI-DL field of the UE assistance information message.

10. The method of claim 1, wherein the second message is a radio resource control (RRC) reconfiguration message, and the third transport layer quantity is carried in a maximum transport layer quantity (MaxMimoLayerNum) field in a serving cell configuration message on a physical downlink shared channel (PDSCH).

11. A terminal, comprising:

one or more processors; and a memory coupled to the one or more processors, wherein the memory is configured to store computer program code including instructions that, when executed by the one or more processors, cause the terminal to be configured to:

recognize a first scenario, and send a first message to a network device, wherein the first message is to request the network device to reduce a quantity of transport layers used in a downlink data transmission process, wherein the first message carries a second transport layer quantity, wherein the second transport layer quantity is less than a first transport layer quantity, wherein the first transport layer quantity is a quantity of transport layers used by the terminal and the network device in the downlink data transmission process, and wherein the first scenario comprises one or more of the terminal running a first application in a foreground of the terminal, a data transmission rate of the terminal being less than a first threshold, a strength of a signal from the network device and received by the terminal being greater than a second threshold;

receive a second message from the network device, wherein the second message is to configure a quantity of transport layers in the downlink data transmission process, wherein the second message carries a third transport layer quantity, and wherein the third transport layer quantity is less than or equal to the second transport layer quantity; and receive and parse a downlink signal from the network device based on the third transport layer quantity.

12. The terminal of claim 11, wherein the first scenario comprises one or more of a group consisting of: a screen of the terminal being off, the terminal entering a power saving mode, the terminal being in a non-charging state, and a temperature of the terminal being greater than a third threshold.

13. The terminal of claim 12, wherein the terminal running the first application in the foreground comprises receiving, by the terminal, a user operation acting on an icon of the first application in a home screen;
- wherein the strength of the signal from the network device being greater than the second threshold comprises detecting, by the terminal, that a reference signal received power (RSRP) or a reference signal received quality (RSRQ) is greater than the second threshold;
- wherein the screen of the terminal being off comprises receiving, by the terminal, no user operation for a preset duration when the screen is on, or receiving, by the terminal, a pressing operation acting on a power key when the screen is on; and
- wherein the terminal entering the power saving mode comprises receiving, by the terminal, a user operation acting on a switch control of power saving mode.

14. The terminal of claim 11, wherein the downlink signal is a first downlink signal, and wherein the instructions, when executed by the one or more processors cause the terminal to be further configured to:
- recognize, after the first downlink signal is received and parsed based on the third transport layer quantity, a second scenario corresponding to the first scenario, and send a third message to the network device, wherein the third message is to request the network device to restore a quantity of transport layers used in the downlink data transmission process;
- receive a fourth message from the network device, wherein the fourth message is to configure a quantity of transport layers in the downlink data transmission process, and wherein the fourth message carries the first transport layer quantity; and
- receive and parse a second downlink signal from the network device based on the first transport layer quantity.

15. The terminal of claim 14, wherein the second scenario comprises one or more of a group consisting of: the terminal running a second application in the foreground other than a first application associated with the first scenario, a data transmission rate of the terminal being greater than a fourth threshold, a strength of a signal from the network device and received by the terminal being less than a fifth threshold, a screen of the terminal being on, the terminal entering a performance mode, the terminal being in a charging state, and a temperature of the terminal being less than a sixth threshold.

16. The terminal of claim 15, wherein the terminal running the second application in the foreground comprises receiving, by the terminal, a user operation for exiting the first application in the process of running the first application;
- wherein the strength of the signal from the network device being less than the fifth threshold comprises detecting, by the terminal, that a reference signal received power (RSRP) or a reference signal received quality (RSRQ) is less than the fifth threshold;
- wherein the screen of the terminal being on comprises receiving, by the terminal, a pressing operation acting on a power key when the screen is off; and
- wherein the terminal entering the performance mode comprises receiving, by the terminal, a user operation acting on a switch control of performance mode.

17. The terminal of claim 14, wherein a duration between a time when the terminal receives the second message and a time when the terminal recognizes the second scenario is greater than or equal to a first duration.

18. The terminal of claim 11, wherein the first scenario is based on the terminal running the first application in the foreground, and wherein a duration between a time when the terminal starts to run the first application in the foreground and a time when the terminal recognizes the first scenario is greater than or equal to a second duration.

19. The terminal of claim 11, wherein the first message is a user equipment (UE) assistance information message, and the second transport layer quantity is carried in a reduced MIMO-LayerFRI-DL field of the UE assistance information message.

20. The terminal of claim 11, wherein the second message is a radio resource control (RRC) reconfiguration message, and the third transport layer quantity is carried in a maximum transport layer quantity (MaxMimoLayerNum) field in a serving cell configuration message on a physical downlink shared channel (PDSCH).

* * * * *